(12) United States Patent
Mizumoto et al.

(10) Patent No.: US 6,385,754 B1
(45) Date of Patent: May 7, 2002

(54) MONITOR AND CONTROL SYSTEM IN TRANSMISSION DEVICE

(75) Inventors: Koji Mizumoto; Toshiaki Hayashi; Masataka Yasunaga, all of Osaka; Kenichi Kuwano, Kawasaki, all of (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/218,502

(22) Filed: Dec. 22, 1998

(30) Foreign Application Priority Data

Jun. 25, 1998 (JP) ............................................ 10-178198

(51) Int. Cl.[7] ............................ G06F 11/00; G06F 7/02; H03M 13/00
(52) U.S. Cl. ........................................ 714/800; 714/821
(58) Field of Search ................................ 714/821, 820, 714/800

(56) References Cited

U.S. PATENT DOCUMENTS

| | | | | |
|---|---|---|---|---|
| 4,084,262 A | * | 4/1978 | Lloyd et al. .................. | 714/47 |
| 4,564,936 A | * | 1/1986 | Takahashi .................... | 370/368 |
| 4,672,374 A | * | 6/1987 | Desjardins ............. | 340/825.07 |
| 5,008,926 A | * | 4/1991 | Misholi .................... | 379/88.13 |
| 5,081,576 A | * | 1/1992 | Ward .......................... | 710/109 |
| 5,291,489 A | * | 3/1994 | Morgan et al. ............. | 370/401 |
| 5,586,173 A | * | 12/1996 | Misholi et al. .......... | 379/88.13 |
| 5,588,120 A | * | 12/1996 | Shitara et al. ............... | 709/212 |
| 5,867,496 A | * | 2/1999 | Peres et al. .................. | 370/376 |
| 6,067,296 A | * | 5/2000 | Heering et al. ............. | 370/363 |

* cited by examiner

Primary Examiner—Albert Decady
Assistant Examiner—Joseph D. Torres
(74) Attorney, Agent, or Firm—Rosenman & Colin LLP

(57) ABSTRACT

A monitor and control system for transmission devices, by which mounting dimensions can be reduced, consumption power can be lowered and the cost can be reduced by reducing a number of connectors connecting units and reducing a number of drivers and receiver ICs is provided. In the monitor and control system for transmission devices, each having a monitor and control package, and plural monitored and controlled packages connected to the monitor and control package through serial buses, the monitor and control package monitors the plural monitored and controlled packages. The monitor and control package has a controller, which generates parallel address and data, and a first converter, which converts the parallel address and data generated by the controller into serial address and data, and each of the plural monitored and controlled packages has a second converter, which converts the serial address and data transmitted from the first converter of the monitor and control package through the serial buses into parallel address and data.

13 Claims, 23 Drawing Sheets

MONITOR AND CONTROL SYSTEM IN TRANSMISSION DEVICE

BACKGROUND OF THE INVENTION

1. Field of the Invention

The present invention relates to a monitor and control system, which monitors operation of plural monitor controlled sections in a transmission device. More particularly, it relates to a monitor and control system, which may prevent physical correspondence of interface signals with the controlled sections to be monitored from being complicated, thereby, to simplify access to the controlled sections by software.

2. Description of the Related Art

FIG. 20 shows a structural example of a transmission device. The transmission device includes plural m units #1 to #m, each unit 200 of which includes plural n MPU interface sections #i-1 to #i-n (i=1 to m).

The transmission device further includes a monitor and control section 100, which monitors the plural n MPU interface sections in each of the plural m units, which are monitored and controlled. The monitor and control section 100 is provided on the first unit #1 as a monitor and control package, for example.

Additionally, the monitor and control section 100 informs statuses of the plural n MPU interface sections #i-1 to #i-n in each unit to be monitored to an operation system 300, which is an upper layered device.

FIG. 21 shows a structural example of the conventional monitor and control system in a transmission device, in which MPU interface sections in each unit are monitored on the structure shown in FIG. 20. Especially, a structure in the case where a monitor and control section 100 (hereinafter, it is called as a monitor control package) interfaces with a section 200 to be monitored and controlled (hereinafter, it is called as a monitored and controlled package) by the use of a memory bus communication method.

In FIG. 21, the monitor and control package 100 is provided on the unit #1. Further, n monitored and controlled packages 200 are provided in each unit #1 to #m. Since each unit has the same structure, only a structure of the unit #1 is shown in detail for simplicity.

The monitor and control package 100 consists of a MPU 1, a memory 2 and a chip select generator 3. The memory 2 latches an address transmitted from the MPU 1. These elements are connected by an address bus 10, a data bus 11 and a reading or writing control signal (RD/WR) line 12, which are parallel buses.

The MPU 1 of the monitor and control package 100 and the monitored and controlled package 200 are connected by a chip select (CS) line 13 generated by the chip select (CS) generator 3 in addition to the address bus 10, the data bus 11 and the reading/writing control signal (RD/WR) line 12.

Therefore, a number of physical connections between the monitor and control package 100 and the monitored and controlled package 200 can be expressed as a total of a number of address lines+a number of data lines+a number of control signal lines+a number of chip select lines, i.e., a number n of the monitored and controlled packages×a number m of the units.

FIG. 22 shows the other embodiment of the conventional monitor and control system, in which the monitor and control package 100 interfaces with the monitored and controlled package 200 by the use of a serial communication method, in which standard protocols are employed.

The MPU 1 of the monitor control package 100 and the monitored and controlled package 200 are connected by a command signal line 14 and a response signal line 15 through a serial interface circuit 4, which supports a standard protocol.

In other words, command signals transmitted through the address bus 10, the data bus 11 or the reading/writing control signal (RD/WR) line are converted into serial signals through the serial interface circuit 4, and the converted signals are output to each MPU interface section #i-1 to #i-n.

On the other hand, response signals, which are serial signals transmitted from the monitored and controlled package 200 are converted into parallel signals by the serial interface circuit 4, and the converted signals are transmitted to the address bus 10, the data bus 11, or the reading/writing control signal (RD/WR) line 12.

However, when employing a standard protocol on the structure shown in FIG. 22, a protocol sequence becomes necessary, and therefore, it is required to execute the processes on a software.

In here, there are following problems when considering the above-described system shown in FIGS. 21 and 22.

At first, it is a problem that a number of connections between the monitor and control package 100 and the monitored and controlled package 200 is increased.

When eight address lines, eight data bus lines, two control signal lines, five monitored and controlled package 200, and three units are employed, for example, the number of the total number of connections becomes 8+8+2+(5×3)=33.

It should be necessary to place such a large number of line patterns on the monitored and controlled package 200. It may become difficult to wire the patterns because of line congestion with the other high-speed main signals (refer to the unit #1 of FIG. 21).

If monitor and control are required between units (refer to units #2 to #m) in FIG. 21, each unit should be connected to the data bus 10 and the address bus 11 for the MPU 1, the control signal line 12, and a chip select line (CS), respectively, by cables, for example.

Therefore, the number of signal lines for transmitting and receiving between units becomes large, and the number of cables is also increased. That structure can not be used in a real system.

On the other hand, although the number of signal lines can be reduced when employing a serial interface by the use of a communication protocol, as shown in FIG. 22, a burden on a software increases. FIG. 23 shows a structure of a standardized protocol communication. As shown in FIG. 23, the structure has a hierarchical design of seven layers. It is necessary to execute processes with cautiousness of, at least, the lower 2 layers, i.e., physical layer and data link layer, when monitoring and controlling a transmission device.

Therefore, when employing a serial communication method by the use of the standard protocol, a software should execute processes for terminating not a little over head for communication. Therefore, the burden on the software becomes large. As the result, that loads more burden on the software development steps, which require a large number of steps when developing a transmission device or system. That also increases a time of developing the transmission device.

From this view point, it is an object of the present invention to provide a monitor and control system in a transmission device, by which a mounting dimension can be reduced, a consumption power can be lowered, and the cost can be reduced by reducing a number of connectors for connecting between units and a number of driver/receiver ICs.

Further, it is another object of the present invention to provide a monitor and control system in a transmission device, for which a software not depending on a protocol can be developed, a time of developing the system can be reduced, and reliability can be realized.

The above-described objects according to the present invention can be achieved by a monitor and control system in a transmission device, having a monitor and control package, and plural monitored and controlled packages connected to the monitor and control package through serial buses, in which the monitor and control package monitors the plural monitored and controlled packages.

The monitor and control package has a controller, which generates parallel address and data, and a first converter, which converts the parallel address and data generated by the controller into serial address and data, and each of the plural monitored and controlled packages has a second converter, which converts the serial address and data transmitted from the first converter of the monitor and control package through the serial buses into parallel address and data.

It becomes possible to facilitate serial communication of an interface between the monitor and control package and each of the monitored and controlled packages, reduce a number of connection lines of the interface, and complete a communication with one bus cycle of a MPU, which is used as the controller.

Additionally, in one preferred mode, the monitor and control package and each of the monitored and controlled packages respectively have first and second timing generator, and outputs from the first and second timing generators control operations of the corresponding first and second converters.

Alternatively, in another preferred mode, the monitor and control package further has a third converter, which converts the serial data transmitted from the monitored and controlled package into parallel data.

Additionally, each of the monitored and controlled packages further has an address judgement section, which judges whether or not the access is addressed to the monitored and controlled package, according to the parallel addresses, which are converted by the second converter.

Further, in one preferred mode, the monitor and control package and each of the monitored and controlled packages respectively has a parity generator, which generates a parity bit and attaches the parity bit to the parallel address and data, and a parity check section, which checks the parity bit of parallel address and data after converting the received serial address and data into parallel address and data.

It becomes possible to monitor errors on serial buses and realize the reliability according to the feature of the present invention.

Alternatively, in one preferred mode, each of the monitored and controlled packages has a memory access controller, and the memory access controller monitors errors on the serial buses, and inhibits to access the memory of the monitored and controlled packages when an error is found.

Furthermore, in one preferred mode, each of the monitored and controlled packages has a memory access controller, and the memory access controller monitors errors on the serial buses, and inhibits to access the memory of the monitored and controlled packages when an error is found.

Alternatively, the monitor and control package has latch circuits, which latches the parallel address and a parallel signal, which is different from the parallel address, and the outputs from the latch circuits are converted to serial signals at the first converters.

On the structure, the parallel address or the parallel signal, which is different from the parallel data are writing and reading control signals, which access the memory of the monitored and controlled package.

Further, other objects of the present invention will become clear by the description for explaining embodiments according to the attached drawings.

DESCRIPTION OF THE PREFERRED EMBODIMENTS

Figure 1:
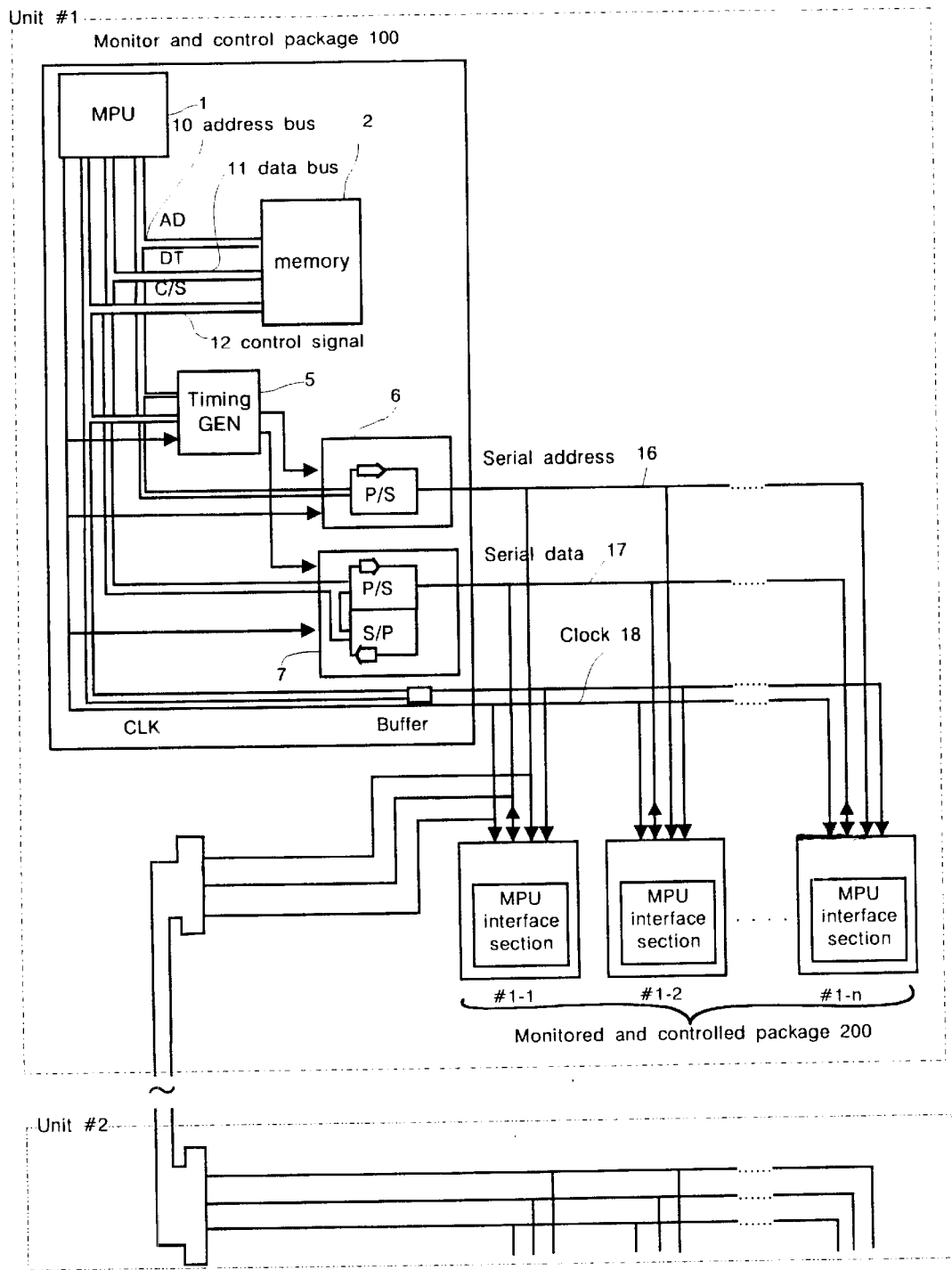
FIG. 1 is a block diagram of a basic structure of an embodiment according to the present invention.

Embodiments of the present invention will be now explained in accompanying with drawings. Throughout the following descriptions, the same reference numerals are used to denote and identify corresponding or identical components in the drawings.

Figure 21:
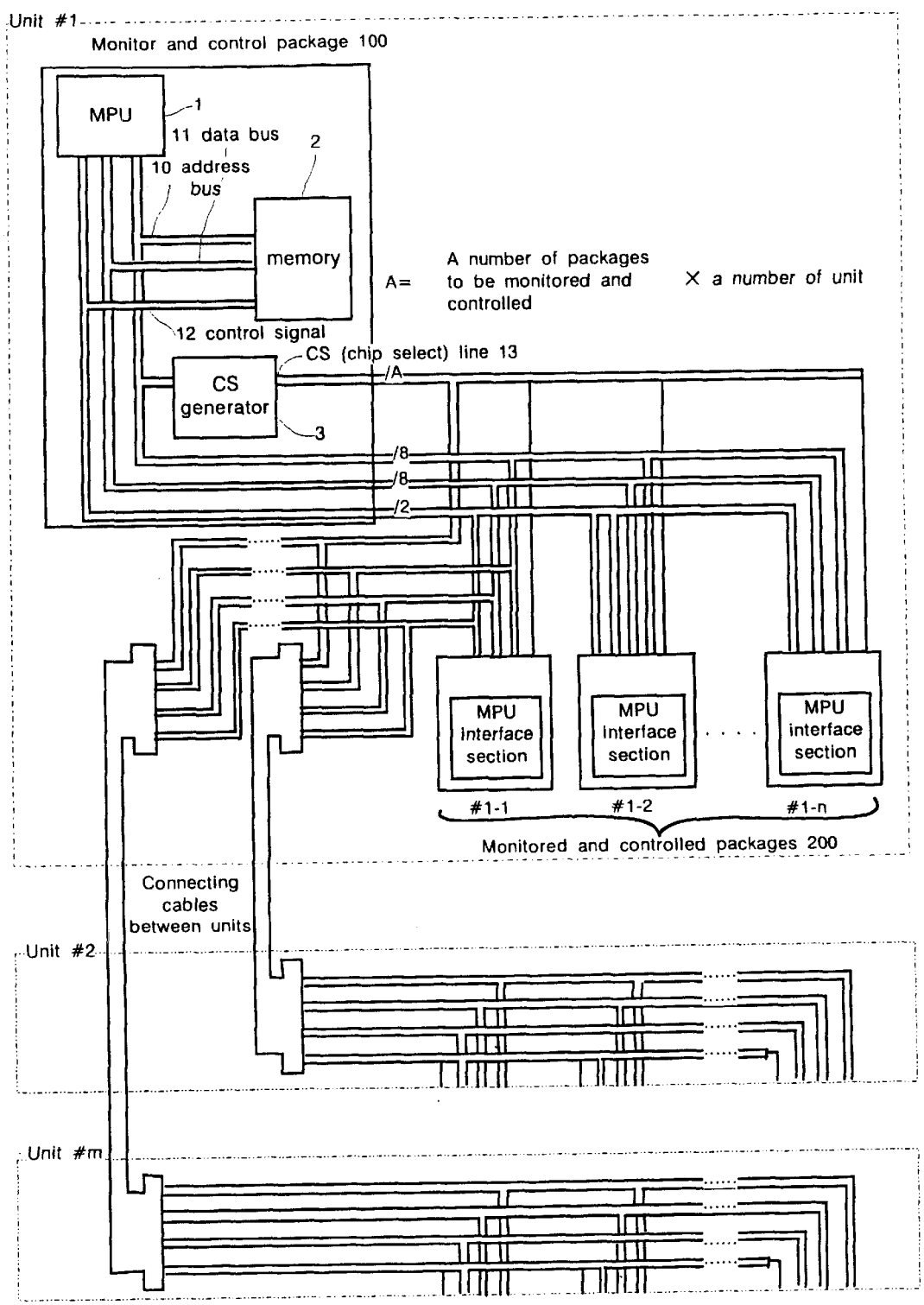
FIG. 21 shows one embodiment of the conventional monitor and control system in a transmission device, by which plural MPU interface sections in each unit are monitored on the structure of FIG. 20.
Figure 22:
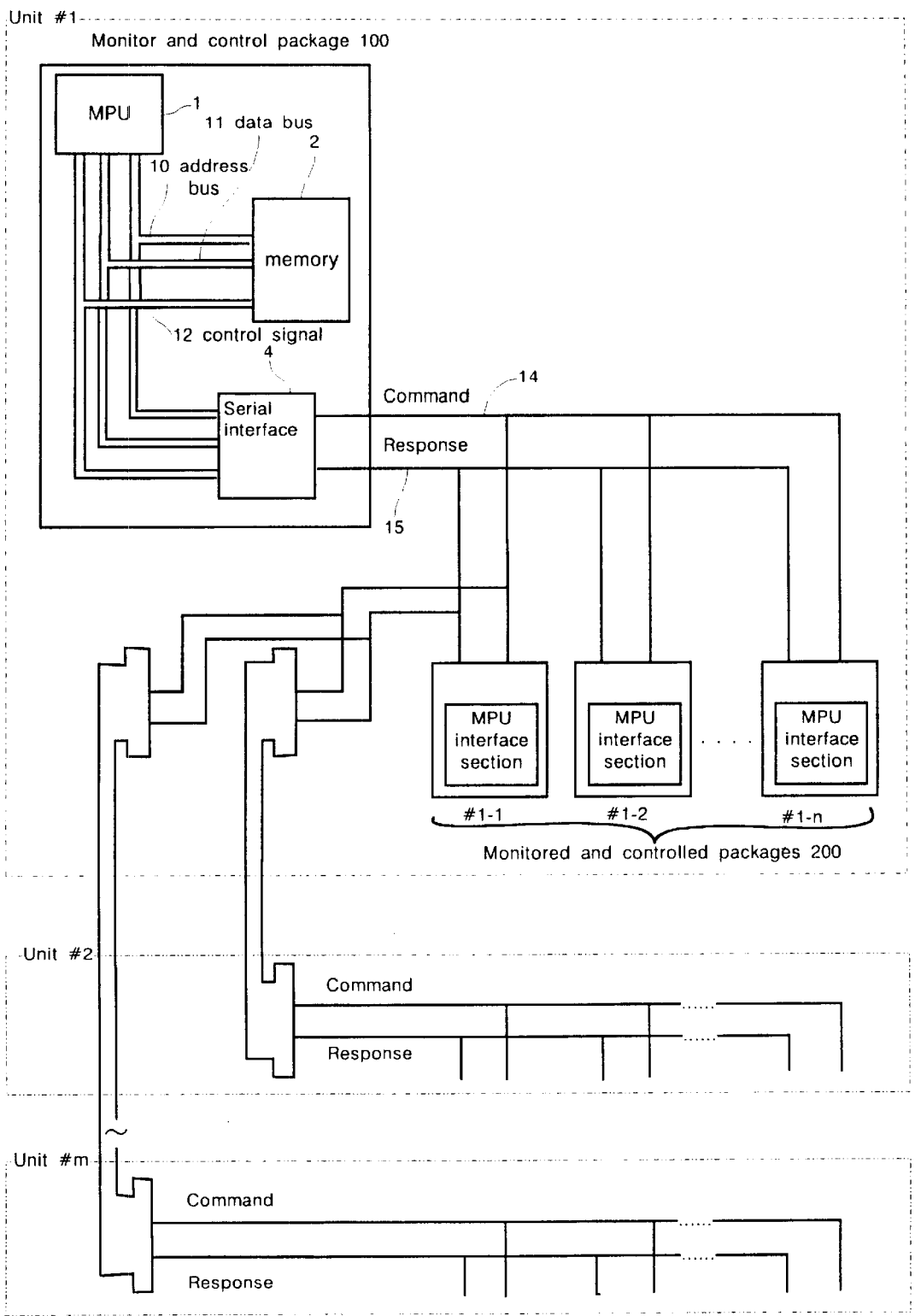
FIG. 22 shows another embodiment of the conventional monitor and control system in a transmission device, which monitors the plural MPU interface sections in each unit on the structure of FIG. 20.
Figure 23:
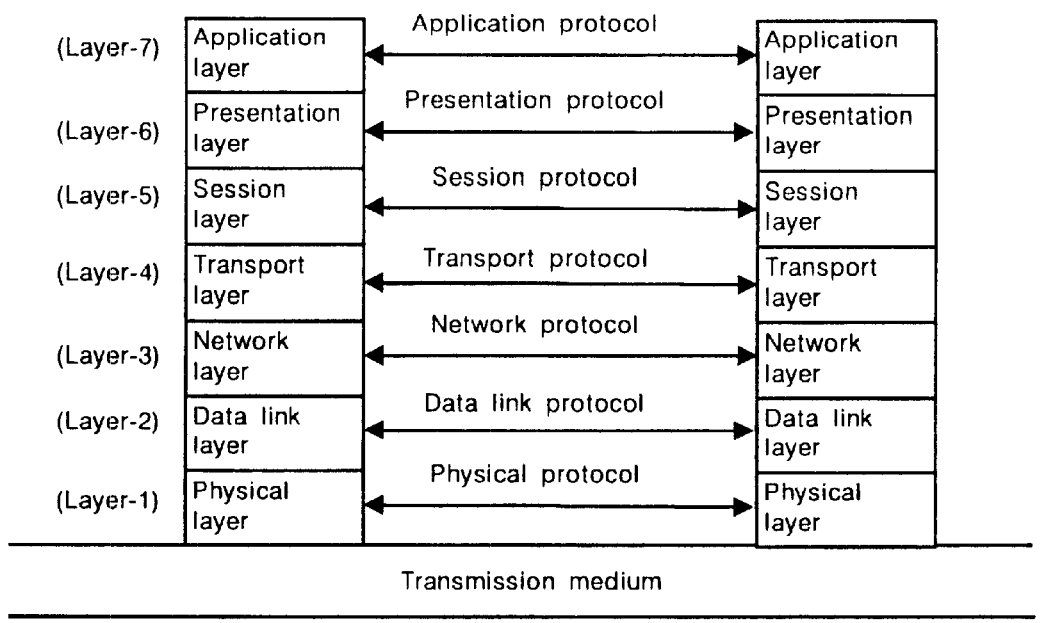
FIG. 23 shows a structure of the standardized protocol communication having a hierarchical seven layers.

FIG. 1 is a block diagram for illustrating a basic structure of an embodiment according to the present invention. A monitor and control package 100 includes a MPU 1, and a memory 2, which latches data from the MPU 1, as shown in FIGS. 21 and 22. The package 100 further includes a timing generator 5, a converter 6, which executes parallel/serial conversion for an address bus 10, a converter 7, which executes parallel/serial conversion and serial/parallel conversion for a data bus 11, according to the present invention.

In the monitor and control package 100, the converters 6 and 7 convert address and data on the parallel address and data buses 10 and 11 into serial address and data, respectively. Then, the monitor and control package 100 transmits the converted address and data to plural MPU interface sections #i-1, #i-2, to #i-n of the monitored and controlled packages 200 with a clock signal generated by the timing generator 5.

In this example, the timing generator 5 controls all timings for converting parallel address and data buses 10 and 11 and serial address and data buses 16 and 17 in the converters 6 and 7 according to the clock signal CLK 18 sent from the MPU 1.

Thereby, it becomes possible to facilitate communications between the monitor and control package 100 and the monitored and controlled packages 200 within one bus cycle of the MPU 1, as explained according to an operational timing chart of the embodiment of the timing generator 5, as described later.

Figure 2:
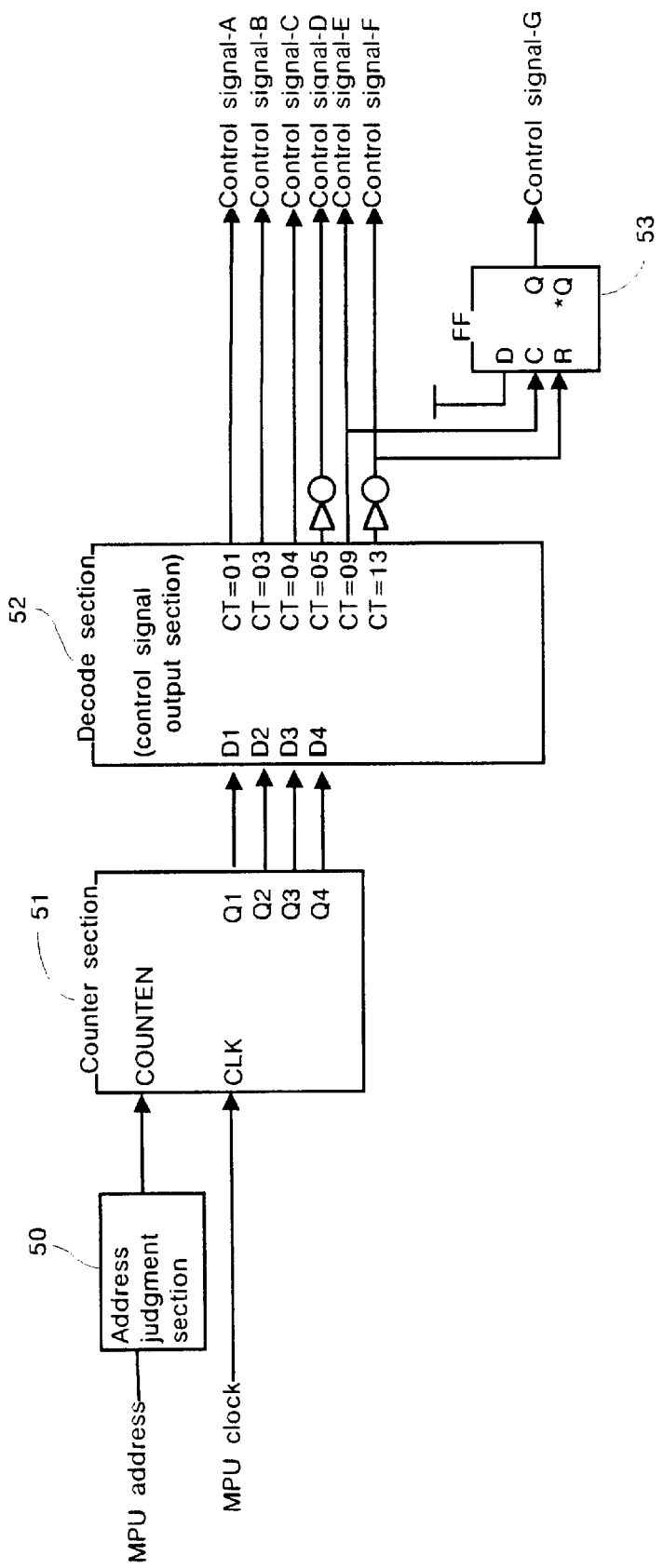
FIG. 2 is a structural diagram of an embodiment of a timing generator 5.
Figure 3:
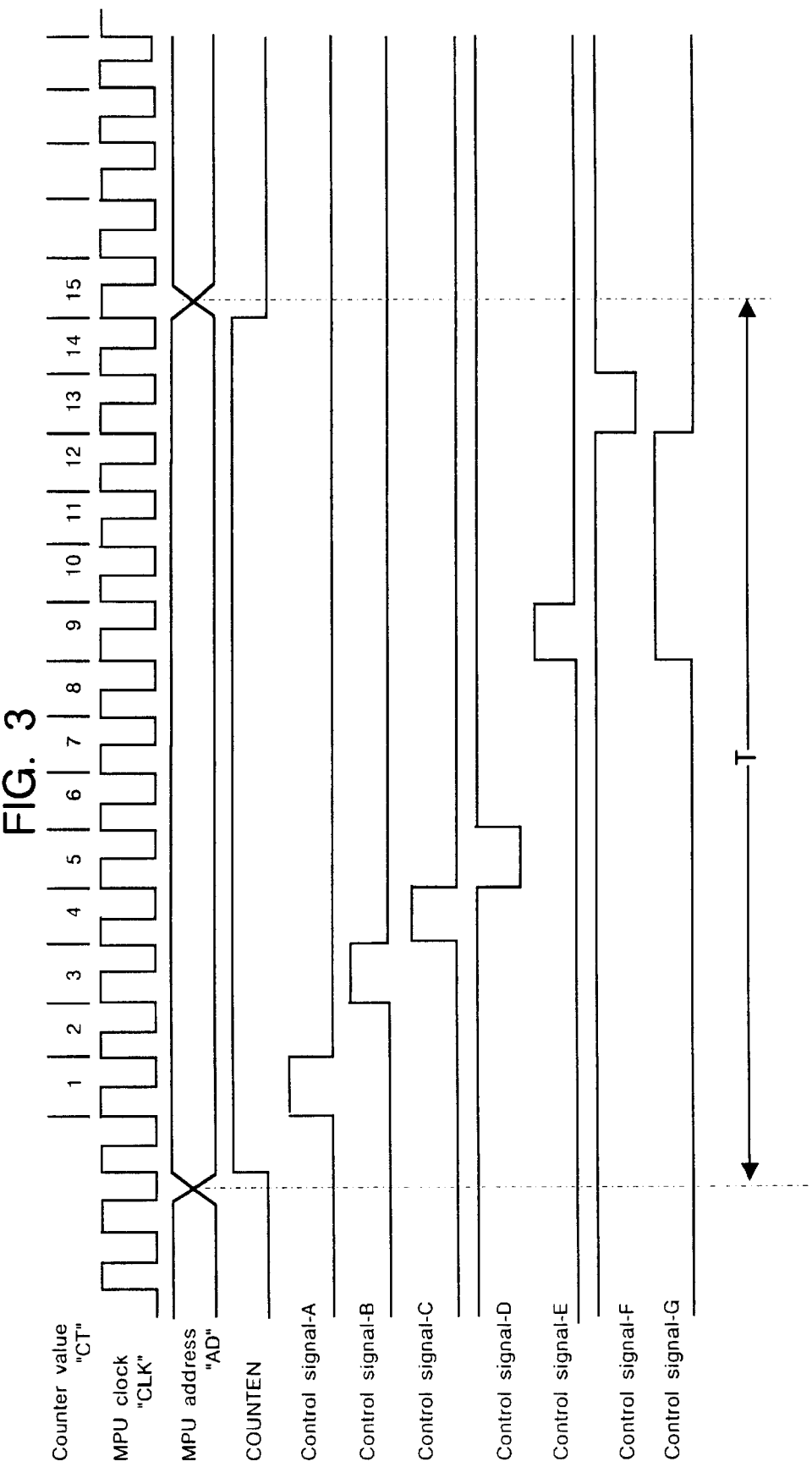
FIG. 3 is an operational timing chart of the timing generator 5 of FIG. 2.

FIG. 2 shows a structural example of an embodiment of the timing generator 5. FIG. 3 is an operational timing chart of the timing generator 5. The timing generator 5 consists of an address judgement section 50, a counter section 51, and a decoding section 52. The address judgement section 50 monitors an address "AD" on the address bus 10 sent from the MPU 1 of the monitor and control package 100 and judges whether or not the address "AD" is accessed from an external device. The counter section 51 counts a clock signal CLK sent from the MPU 1 of the monitor and control package 100. The decoding section 52 controls the parallel/serial and serial/parallel converters 6 and 7 according to a value "CT" counted in the counter section 51.

When generating a bus access of the MPU 1, the address judgement section 50 of the timing generator 5 judges whether or not the access is addressed to the external device, according to the address. When the access is addressed to the external device, the address judgement section 50 outputs a count enable signal (hereinafter, it is called as COUNTEN signal to the counter section 51.

The counter section 51, which receives the COUNTEN signal, starts counting the clock signals CLK of the MPU 1, and outputs the result to the decoding section 52. The decoding section 52 decodes the received result and outputs required control signals to the converters 6 and 7.

On the operations of the embodiment, as shown in the operational timing chart of FIG. 3, when the counter value (hereinafter, it is referred as CT) is 1, the decoding section 52 outputs a control signal A, when the counter value "CT" is 5, the section 52 outputs a control signal D. Further, it is also possible to generate a control signal, such as a control signal G, by combining the control signals and a latch circuit 53.

In this way, the monitor and control package 100 controls operations of latching enable signals and serial/parallel or parallel/serial conversions on the converters 6 and 7 by generating the control signals A to G generated by the timing generator 5. A timing signal T1a to T16a, which are employed to embodiments explained later, can be generated by employing one of the control signals A to G or combining the control signals A to G.

In the present invention, the timing generator 5 controls the address and data buses 10 and 11, which are parallel buses of the monitor and control package 100, with the use of the above-described structure.

Then, the control and monitor package 100 controls the parallel/serial or serial/parallel converters 6 and 7 to convert the buses into the address bus 16 and the data bus 17, which are serial buses as hardware. Thereby, the monitor and control package 100 can facilitate communications with the monitored and controlled package 200 within one bus cycle T (refer to FIG. 3) of the MPU 1. Therefore, it becomes possible to simplify processes on a software for communications.

It is also possible to reduce a number of connections by having a serial interface with the monitored and controlled package 200. As a communication is completed within one bus cycle of the MPU 1, communications can be performed, similarly to memory access. As the converters 6 and 7, which are hardware, executes parallel/serial or serial/parallel conversions, it becomes no need to perform processes on the software for protocol communications.

Therefore, the number of connections can be reduced by using a memory bus communication method, when interfacing the monitor and control package 100 with the monitored and controlled package 200, and therefore, a serial interface, which is no need to execute special processes of the software, similarly to the case of the memory access, can be realized, thus improving performance of the system.

Figure 4:
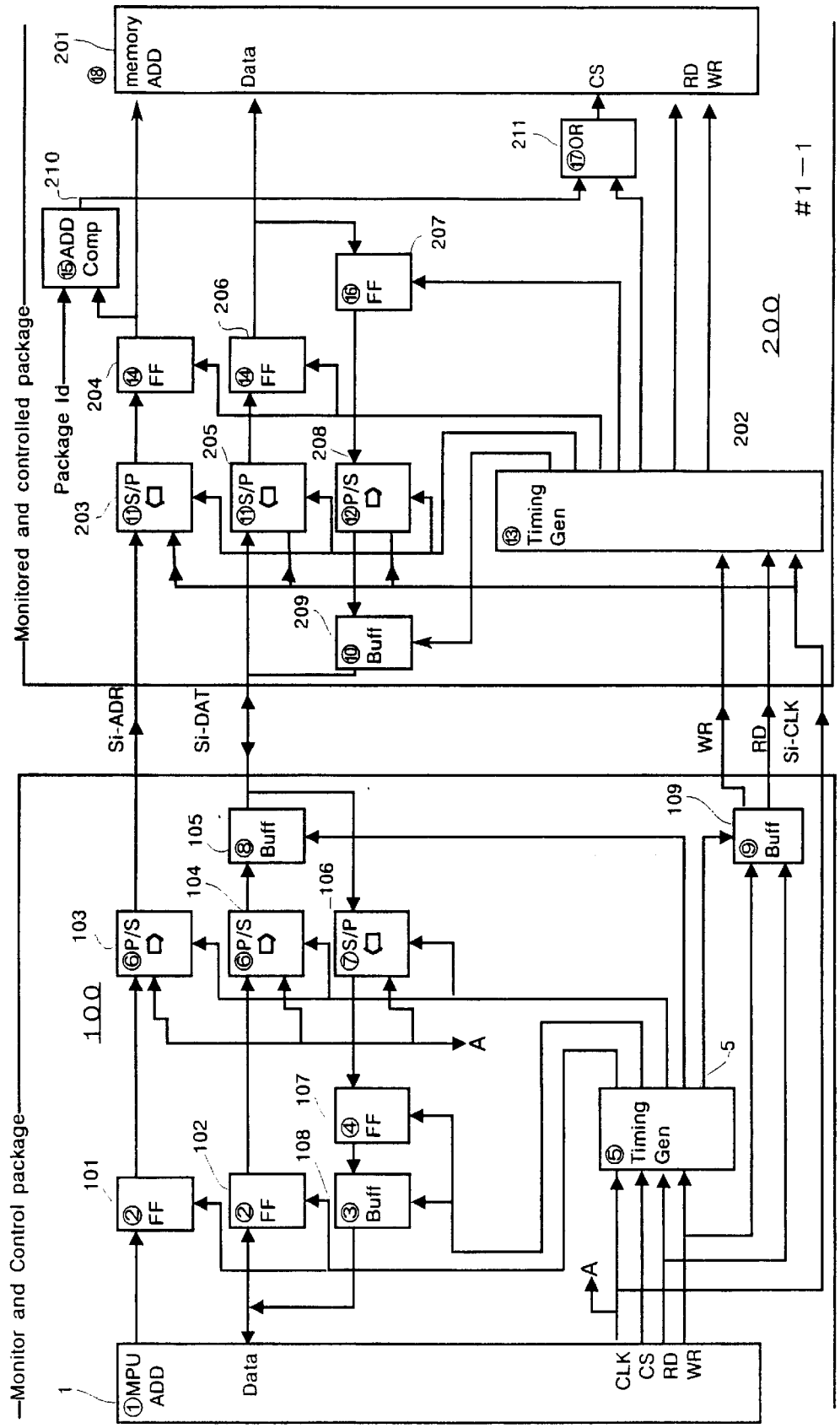
FIG. 4 is a block diagram of a first embodiment of a monitor and control package 100 and a monitored and controlled package 200.

FIG. 4 is a first embodiment of the monitor and control package 100 and the monitored and controlled package 200. The monitor and control package 100 interfaces with the monitored and controlled package 200 by the use of a serial address (Si-ADR) bus, a serial data (Si-DAT) bus, a serial clock (Si-CLK) bus, writing (WR) and reading (RD) signal lines.

In this example, a case where the monitor and control package 100 accesses the memory 201 of the monitored and controlled package 200 will be considered. The structure of the first embodiment will be now explained in accompanying with the structure of FIG. 1. The address and data sent from the MPU 1 of the monitor and control package 100 are latched by latch circuits 101 and 102, which correspond to the memory 2 of FIG. 1. Each of the latch circuits employed in this embodiment is formed of a flip flop.

Parallel/serial (P/S) converters 103 and 104, which correspond to the converters 6 and 7, convert the address and data latched by these latch circuits 101 and 102 into serial signals.

The serial data output from the parallel/serial (P/S) converter 104 is output through an output buffer 105 according to a timing signal sent from the timing generator 5.

On the other hand, a serial/parallel converter 106, which corresponds to the converter 7 of the monitor and control package 100 of FIG. 1, converts the data sent from the monitored and controlled package 200 into parallel data, and a latch circuit 107 latches the converted data. Then, the parallel data is transmitted to the MPU 1 through a received data output buffer circuit 108.

The timing generator 5 receives reading or writing command (RD/WR) sent from the MPU 1 and a clock signal CLK, and supplies the clock signal CLK to each section of the monitor and control package 100 in synchronism with the reading or writing (RD/WR) command.

The RD/WR command is output through a buffer circuit 109, and the clock signal CLK is directly output from the monitor and control package 100 and is transmitted to the monitored and controlled package 200.

On the other hand, although the monitored and controlled package 200 in FIG. 4 has a structure of a first package #1—1 of the unit #1, other packages also have the same structure as that.

The monitored and controlled package 200 has a structure, which is almost equivalent to the monitor and control package 100. Therefore, the monitored and controlled package 200 includes a timing generator 202, which receives the RD/WR command and the clock signal CLK transmitted from the monitor and control package 100.

Then, the timing generator 202 generates a clock signal employed in the monitored and controlled package 200 in synchronism with the RD/WR command, and supplies the clock signal to each section of the package 200. A serial/parallel converter 203 converts the serial address into a parallel address, and a latch circuit 204 latches the converted address. Similarly, a serial/parallel converter 205 converts the serial data into parallel data, and a latch circuit 206 latches the converted data.

A comparator 210 compares the output from the latch circuit 204 with the address given to its own package. If both addresses are coincident, it becomes possible to access the memory 201.

Therefore, a chip select signal CS is output from an access control section 211, which is formed of an OR gate, and then, it becomes possible to access to an address position of the memory 201, which corresponds to the address sent from the latch circuit 204. When writing the data output from the latch circuit 206, the writing (WR) command is given from the timing generator 202 to the latch circuit 206, and therefore, it becomes possible to write the data.

On the contrary, when reading the data output from the latch circuit 206, the reading (RD) command is given from the timing generator 202 to the memory 201, and therefore, it becomes possible to read the data out. A latch circuit 207 latches the read data, which is parallel data, a parallel/serial converter 208 converts the latched read data into serial data, and the converted data is transmitted through a buffer circuit 209 to the monitor and control package 100.

Figure 5:
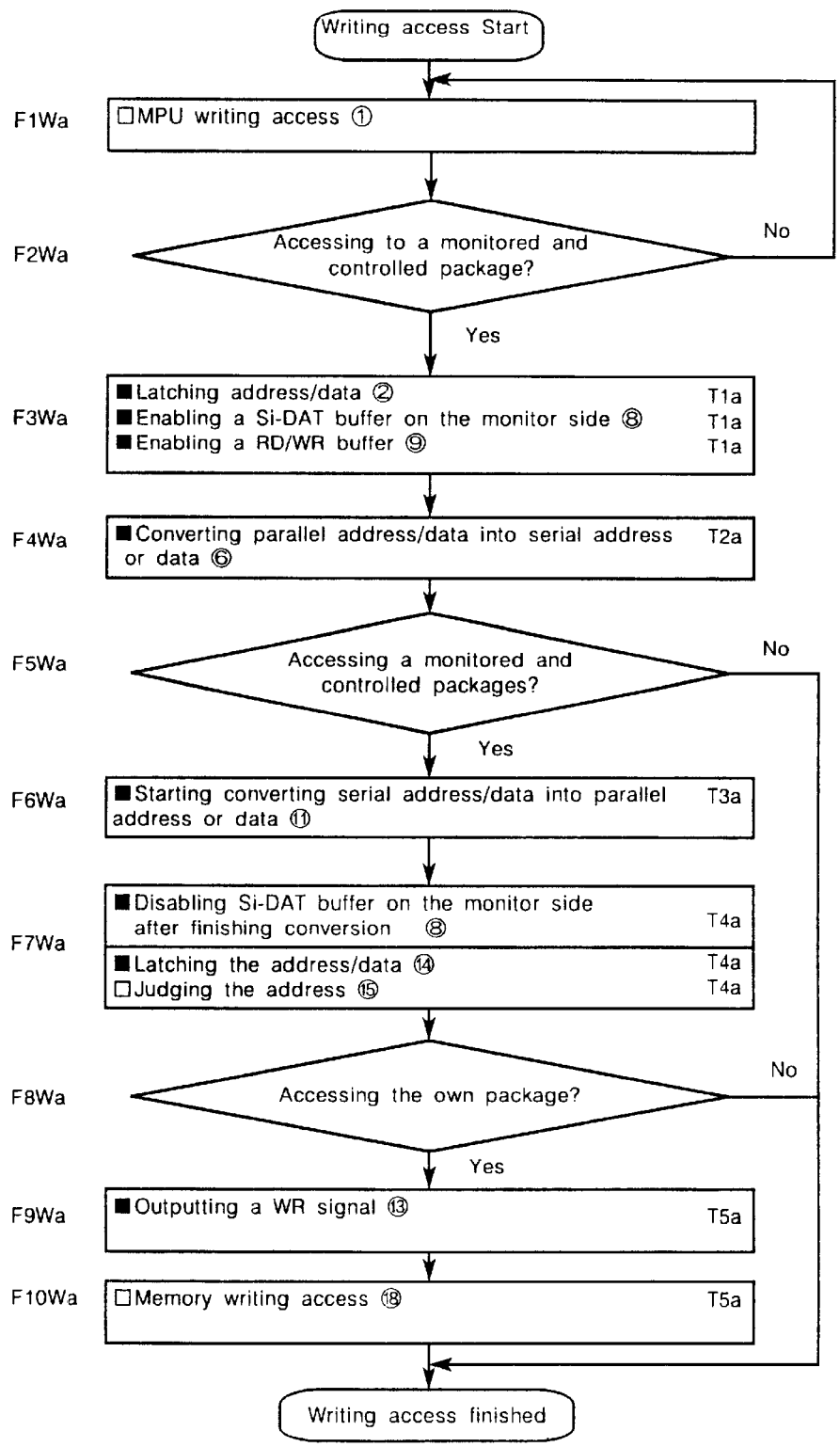
FIG. 5 is an operational flow chart of writing access of the monitor and control package 100 and the monitored and controlled package 200.
Figure 6:
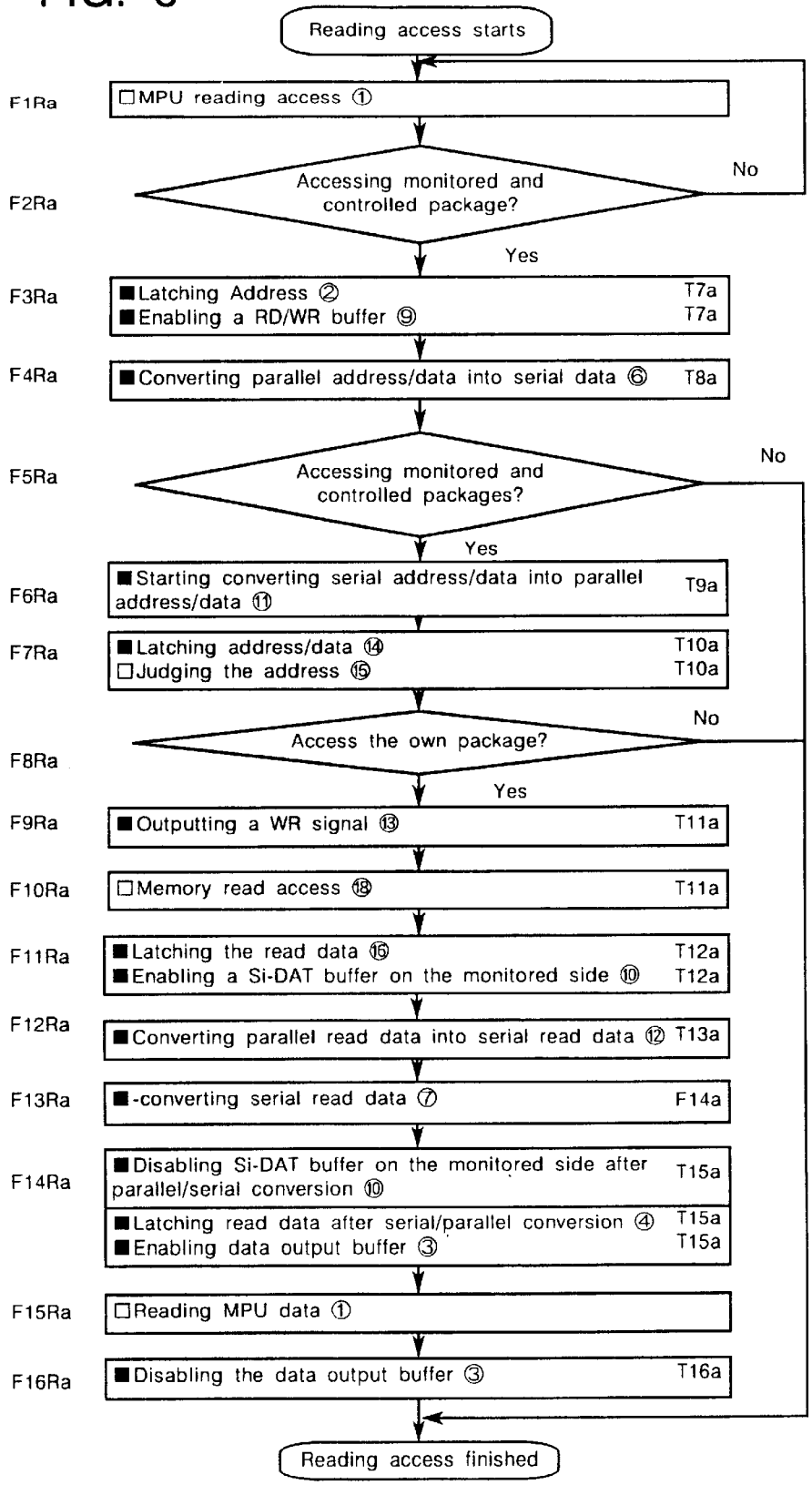
FIG. 6 is an operational flow chart of reading access of the monitor and control package 100 and the monitored and controlled package 200.
Figure 7:
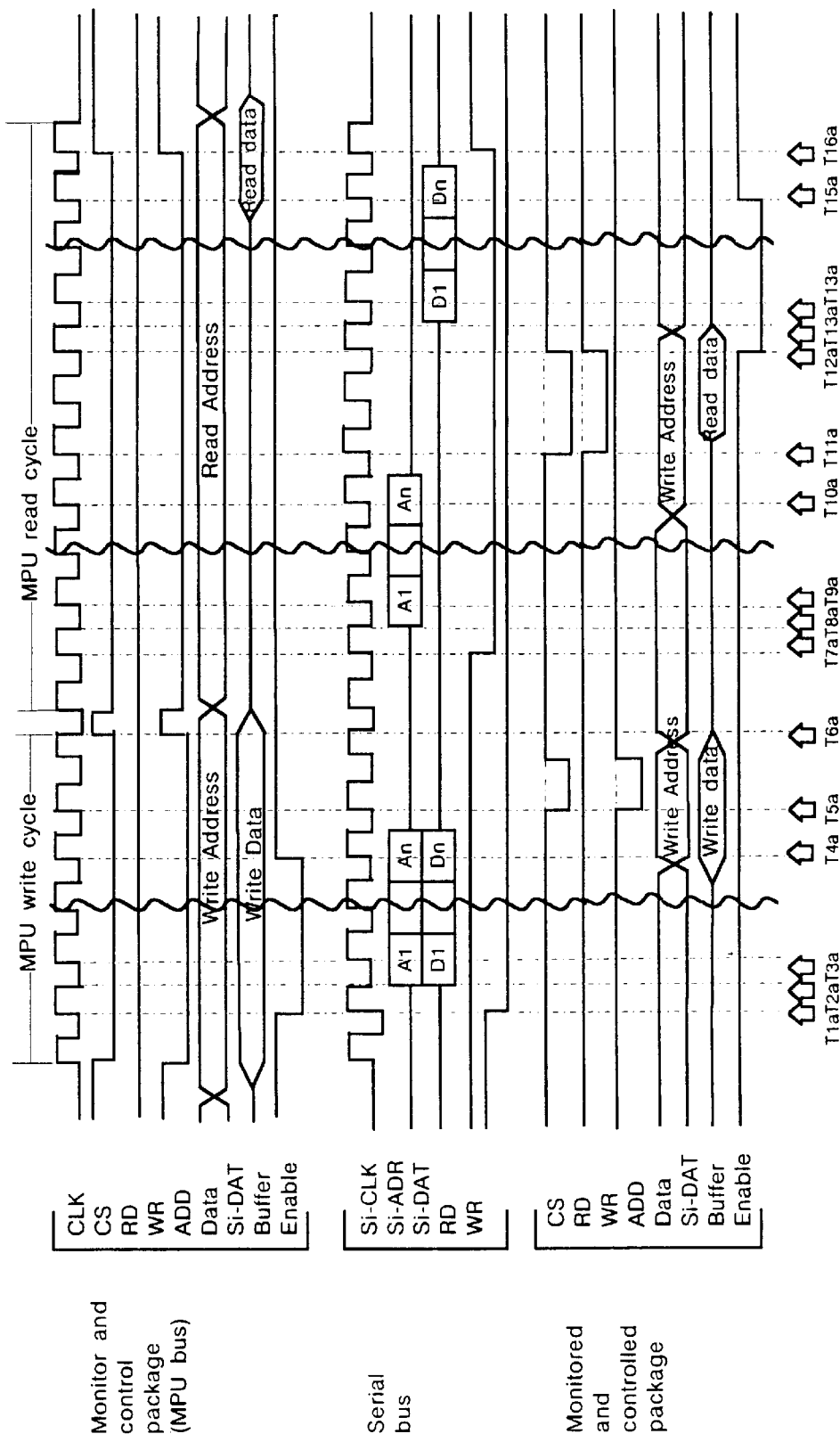
FIG. 7 is an operational timing chart of the monitor and control package 100 and the monitored and controlled package 200.

FIGS. 5 and 6 show operational flow charts, and FIG. 7 is a timing chart of the monitor and control package 100 and the monitored and controlled package 200, which are formed as the above-described structure. Writing and reading access operations will be now explained in accompanying with these diagrams.

In FIGS. 5 and 6, numbers enclosed with circles correspond to those of FIG. 4. Further, numbers of Tx correspond to those of FIG. 7. In these diagrams, ≡ means processes controlled by the timing generator 5, and □ means operations controlled by other devices except the timing generator 5.

Further, numbers of Tx in FIG. 7 have the following meaning:

T1a: Latching address/data, enabling a Si-DAT buffer on the monitor and control package, and enabling an RD/WR buffer T2a: Starting parallel/serial transmission of address /data T3a: Starting serial/parallel reception of address/data T4a: Latching address/data, disabling a Si-DAT buffer on the monitor and control package, and judging the address T5a: Outputting a CS/WR signal (memory writing process)

T6a: Finishing the memory writing access

T7a: Latching address/data, and enabling a RD/WR buffer

T8a: Starting parallel/serial transmission of an address

T9a: Starting serial/parallel reception of an address

T10a: Judging a timing for latching the address and the address

T11a: Outputting a CS/RD signal (memory reading process)

T12a: Latching read data, enabling a Si-DAT buffer on the monitored and controlled package, and judging the address T13a: Starting parallel/serial transmission of the read data T14a: Starting serial/parallel reception of the read data T15a: Latching the read data, disabling a Si-DAT buffer on the monitored and controlled package, and enabling a data output buffer T16a: Finishing memory reading access and disabling the data output buffer.

The writing access will be now explained at first. When a writing access request is generated from the MPU 1 of the monitor and control package 100 (refer to FIG. 5: STEP F1Wa), the address judgement section 50 (refer to FIG. 2) judges whether or not the access is addressed to the monitored and controlled package 200 (refer to FIG. 5: STEP F2Wa).

When the access is addressed to the monitored and controlled package 200, the timing generator 5 controls the latch circuits 101 and 102 to latch address and data, makes a serial data buffer 105 of the monitor and control package 100 enable, and further makes a RD/WR buffer 109 enable (T1a of STEP F3Wa).

Then, parallel/serial converters 103 and 104 convert the latched address and data into serial address and data and transmit them to the monitored and controlled package 200 (T2a of STEP F4Wa). After completing the transmission of the serial address and data, the serial data buffer 105, which is provided on the monitor and control package 100, is disabled (T4a of STEP F7Wa).

On the other hand, on the monitored and controlled package 200, when outputting the WR signal on the serial bus (STEP F5Wa), the timing generator 202 becomes a receiving state, and serial/parallel converters 203 and 205 convert the serial address and data into parallel address and data (T3a of STEP F6Wa).

After completing the reception of the address and data, the received address and data are respectively latched in the latch circuits 204 and 206, and the latched address and data are transmitted to the memory 201. Then, the address judgement section 210 judges whether or not the address and data are addressed to the own package (T4a of STEPS F7Wa).

In this example, when the address and data are not addressed to the own package, the memory access controller 211 masks the memory chip select signal CS (STEP F8Wa). When the access is addressed to the own package, the timing generator 202 outputs a WR signal (T5a of STEP F9Wa), executes a memory writing access to the memory 201, and finishes the writing access (T5a of STEP F10Wa).

Next, a reading access operation will be explained.

When generating a memory reading access request from the MPU 1 of the monitor and control package 100 (refer to FIG. 6: STEP F1Ra), the timing generator 5 judges whether or not the access is addressed to the monitored and controlled package 200 (STEP F2Ra).

When the access is addressed to the monitored and controlled package 200, the timing generator 5 controls the latch circuit 101 to latch the address and makes the RD/WR buffer 109 enable (T7a of STEP 3Ra and T7a of FIG. 7).

Further, the parallel/serial converter 103 converts the address latched by the latch circuit 101 into a serial address, and transmits it to the monitored and controlled package 200 (T8a of STEP F4Ra).

When outputting a reading signal RD to the serial bus, the monitored and controlled package 200 becomes a receiver, and the converter 203 on the package 200 converts the serial address into a parallel address (T9a of STEP F6Ra).

When completing the address reception, the latch circuit 204 latches the received address, and transmits it to the memory 201. Simultaneously, the address judgement section 210 judges whether or not the access is addressed to the own package (STEPS F7Ra and F8Ra).

In this example, when the access is not addressed to the own package, the memory address control circuit 211 masks the memory chip select signal CS (refer to T10a of FIG. 7).

On the contrary, when the access is addressed to the own package, the timing generator 5 outputs a CS/RD signal, and executes the memory reading access (T11a of STEPs F9Ra and F10Ra).

After completing the memory reading access, the timing generator 202 latches the read data to the latch circuit 207, and makes the serial data buffer 209 on the monitored and controlled package 200 enable (T12a of STEP F11Ra).

Then, the parallel/serial converter 208 converts the read data latched by the latch circuit 207 into serial data, and transmits it to the monitor and control package 100. Here, the read data transmission is completed (T13a of STEP F12Ra). Then, the serial data buffer 209 on the monitored and controlled package 200 is disabled (T15a of STEP F14Ra).

When transmitting the read data from the monitored and controlled package 200, the serial/parallel converter 106 of the monitor and control package 100 converts the received data into parallel data (T14a of STEP F13Ra). After completing the conversion, the monitor and control package 100 makes the latch circuit 107, which latches the read data, and the data output buffer 108 enable (T15a of STEP F14Ra).

When finishing the MPU reading access after transmitting the read data to the MPU bus, the data output buffer 108 is disabled, and the reading access is completed (T16a of STEP F16Ra).

A case where eight address lines, eight data lines, two control signal lines, and five monitored and controlled packages are employed on the structure shown in FIG. 1 will be now considered. When comparing a number of lines in the parallel bus access communication system with that in the system according to the present invention, the relationship can be expressed as follows:

|  | Conventional system (parallel bus access communication system) | Embodiment |
| --- | --- | --- |
| Address line | 8 | 1 |
| data line | 8 | 1 |
| control line | 2 | 2 |
| CS | 5 | none |
| Transfer clock | none | 1 |
| Total | 23 | 5 |

The number of connection lines of the interface between the monitor and control package 100 and the monitored and controlled package 200 becomes about one-fifth as many as the conventional structure. Therefore, it is very useful to wire patterns.

Additionally, as a communication protocol is not employed in this structure, it is possible to facilitate communications with a monitored and controlled package with one bus cycle of the MPU 1 from a software, similarly with a normal memory access operation.

When the access is not addressed to the own package, the memory access is inhibited by masking the CS signal not to execute reading or writing access of the error data. That realizes reliability of the communication data.

Figure 8:
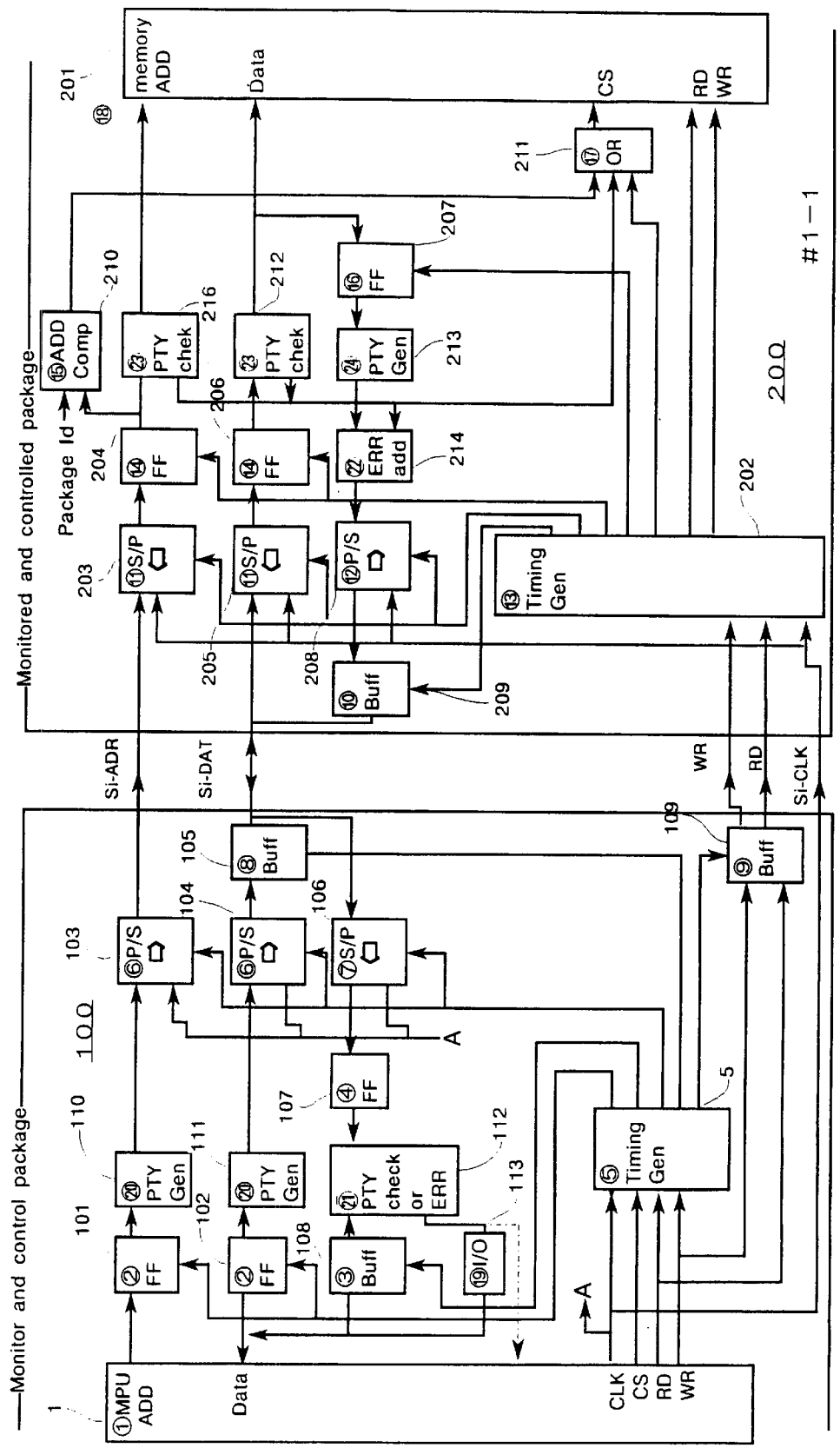
FIG. 8 is a block diagram of a second embodiment of the monitor and control package 100 and the monitored and controlled package 200.

FIG. 8 shows a block diagram of a second embodiment of the present invention. The second embodiment is constituted so as to attach parities to the address and data of the first embodiment shown in FIG. 4.

Therefore, the monitor and control package 100 further has transmitted address/data parity generating and attaching sections 110 and 111, a received data parity check and transmitted status (error code) executing section 112, and a transmitted status displaying register 113 in addition to the structure of the first embodiment.

On the other hand, the monitored and controlled package 200 further includes received address/data parity checking sections 216 and 212, transmitted data parity generating and attaching section 213, and a transmitted status (error code) generating and attaching section 214.

Figure 9:
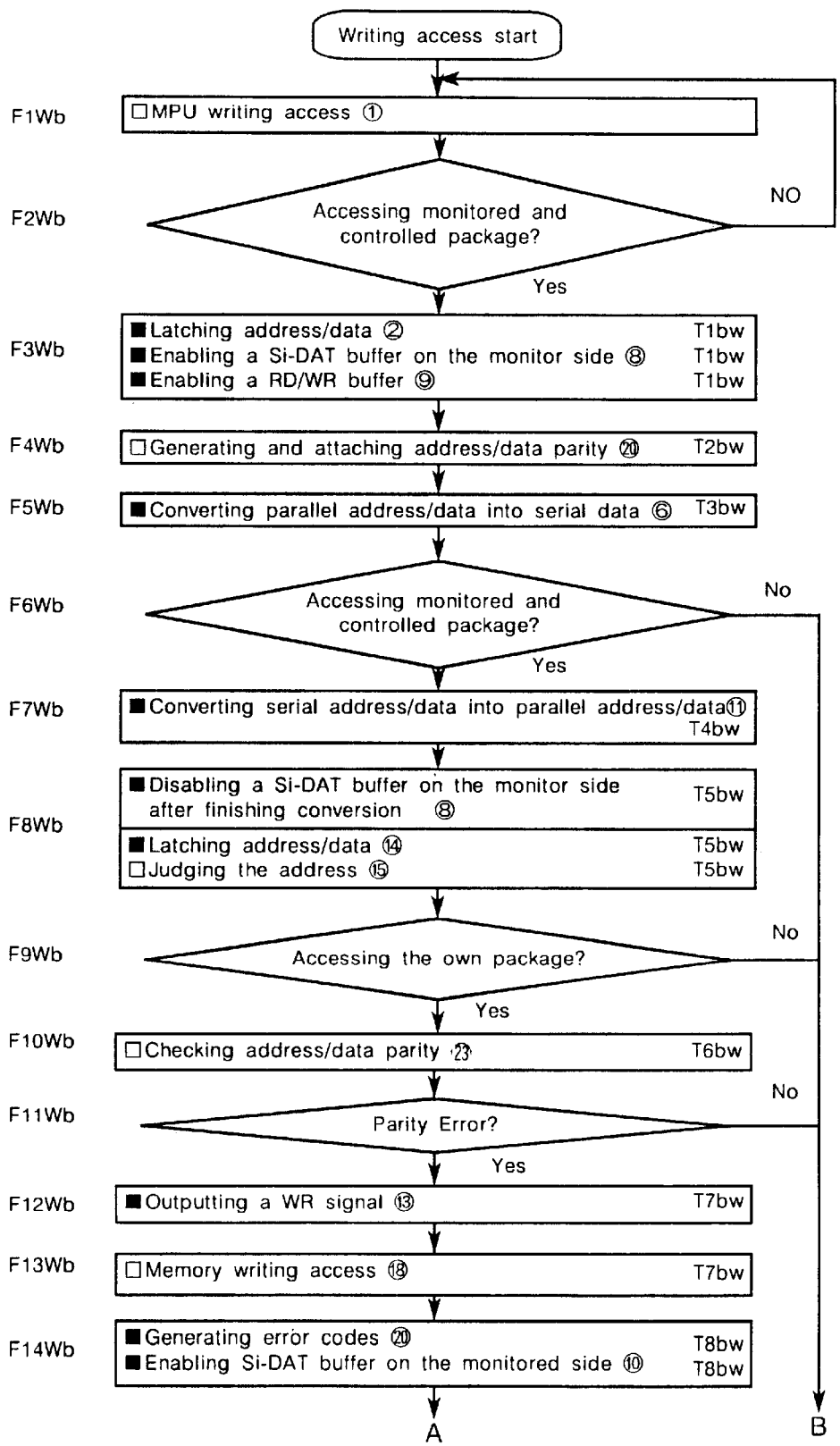
FIG. 9 is a first operational flow chart when executing the writing access corresponding to the second embodiment.
Figure 10:
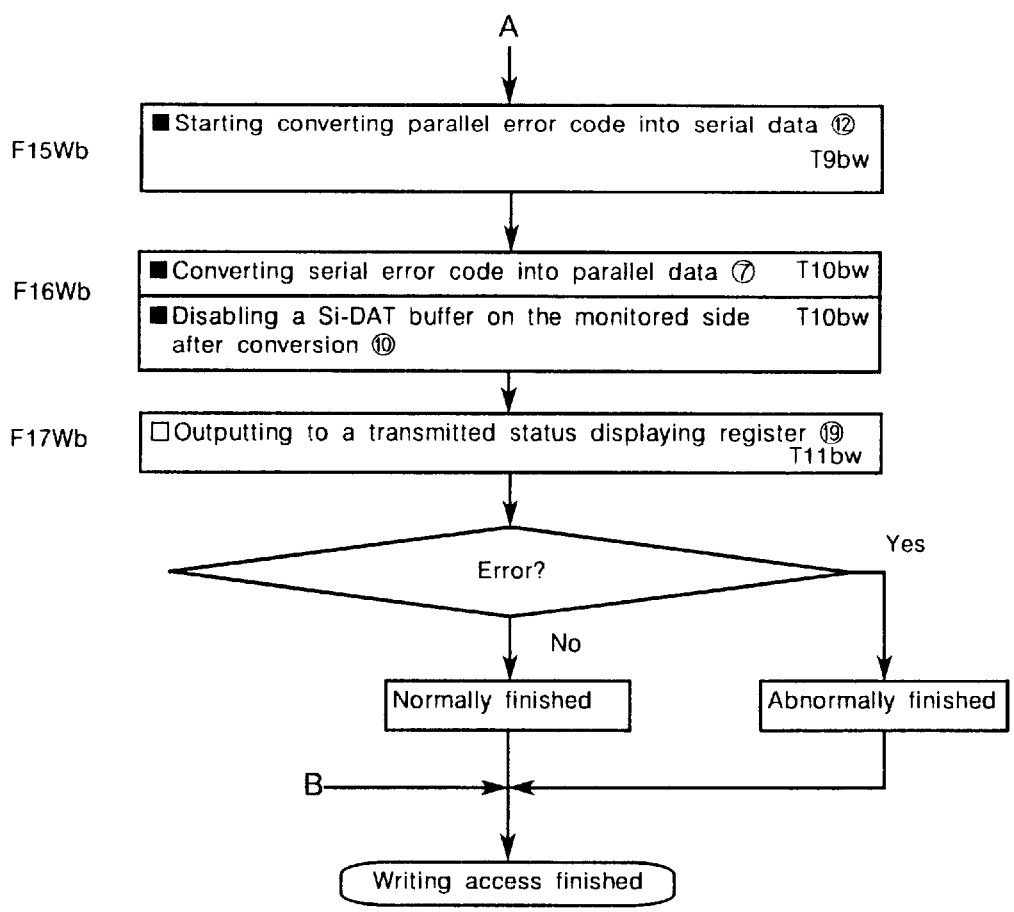
FIG. 10 is a second operational flow chart when executing the writing access corresponding to the second embodiment.
Figure 11:
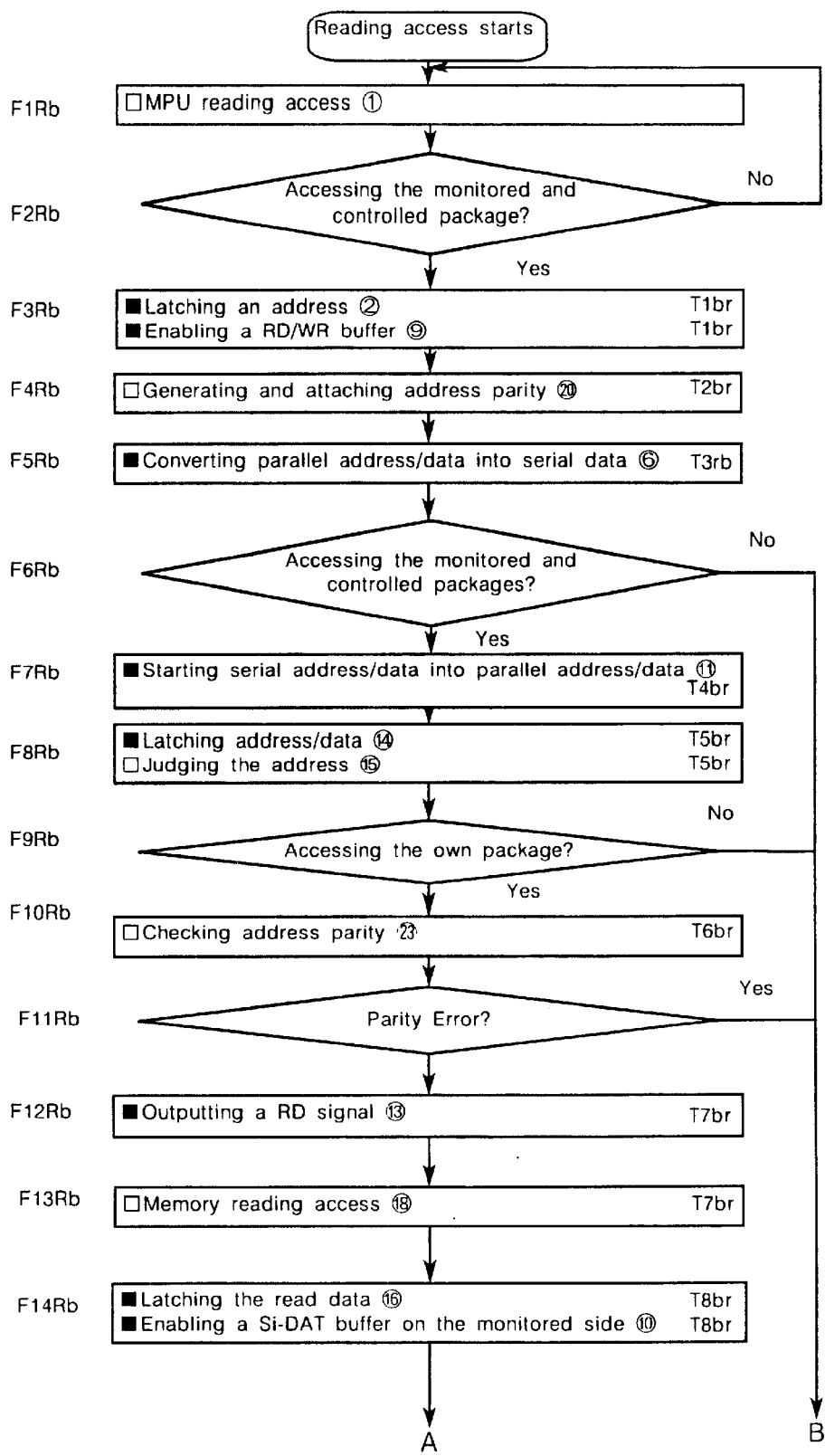
FIG. 11 is a first operational flow chart when executing the reading access corresponding to the second embodiment.
Figure 12:
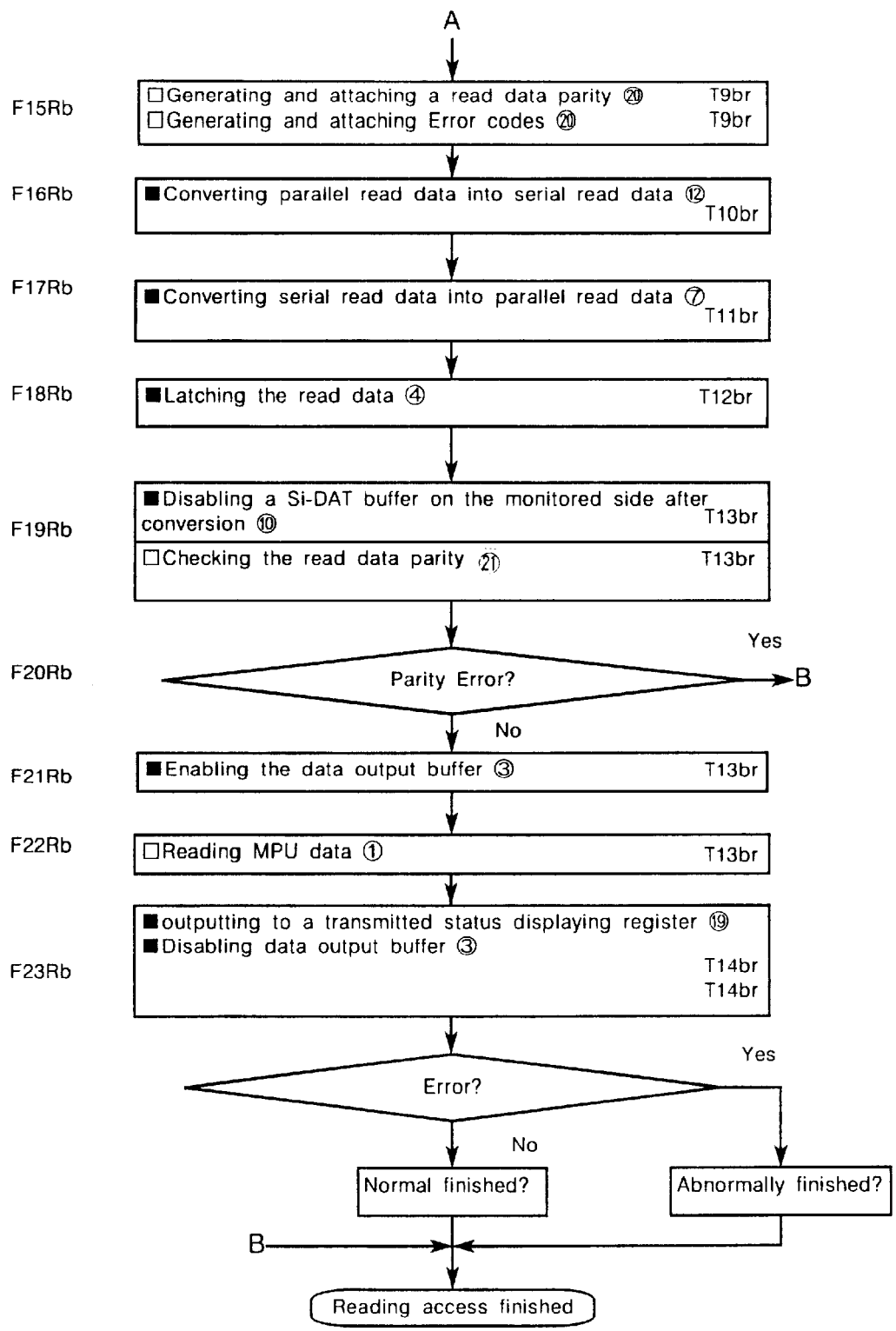
FIG. 12 is a second operational flow chart when executing the reading access corresponding to the second embodiment.
Figure 13:
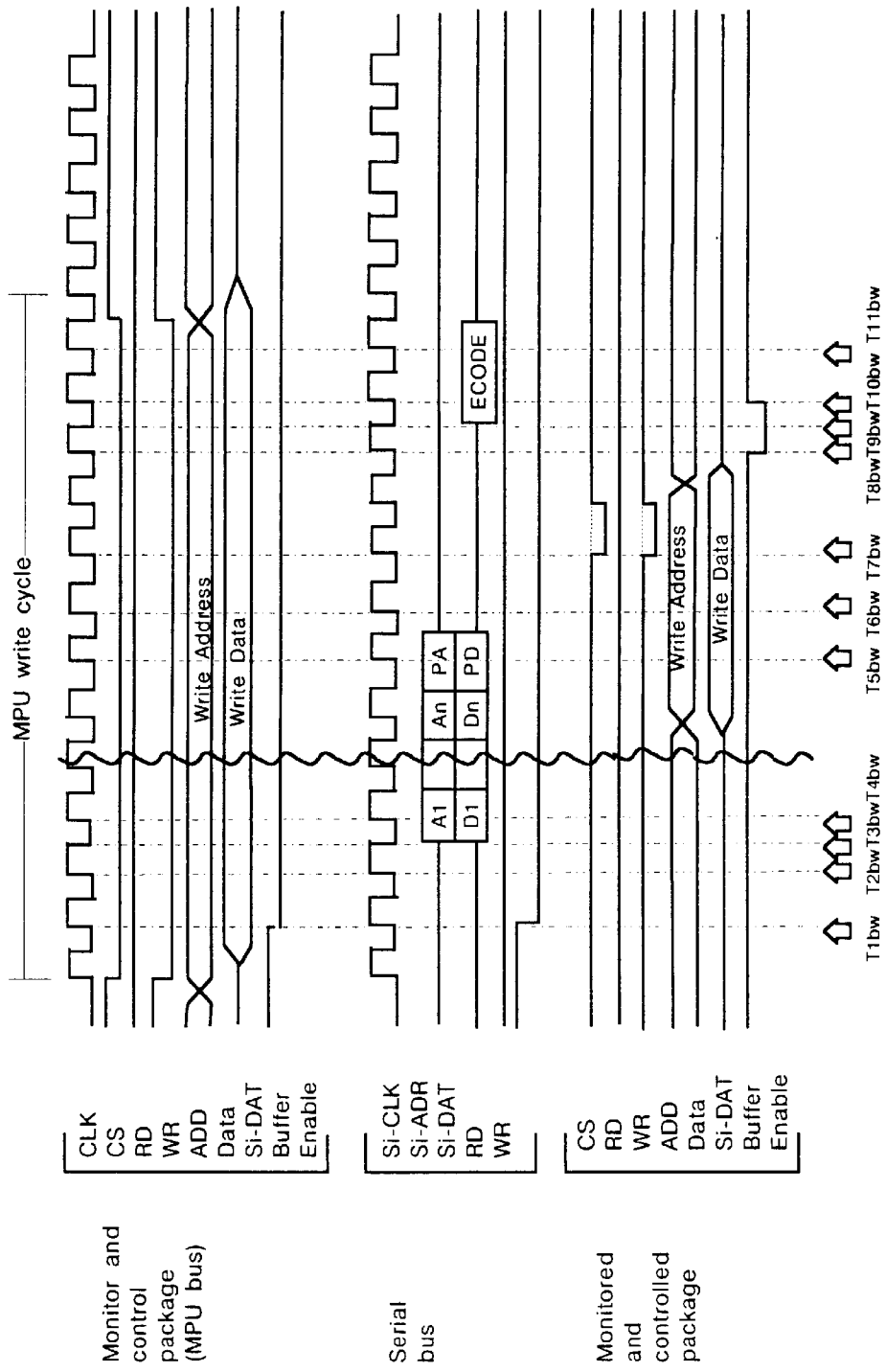
FIG. 13 is a timing chart when executing the writing access corresponding to the second embodiment.
Figure 14:
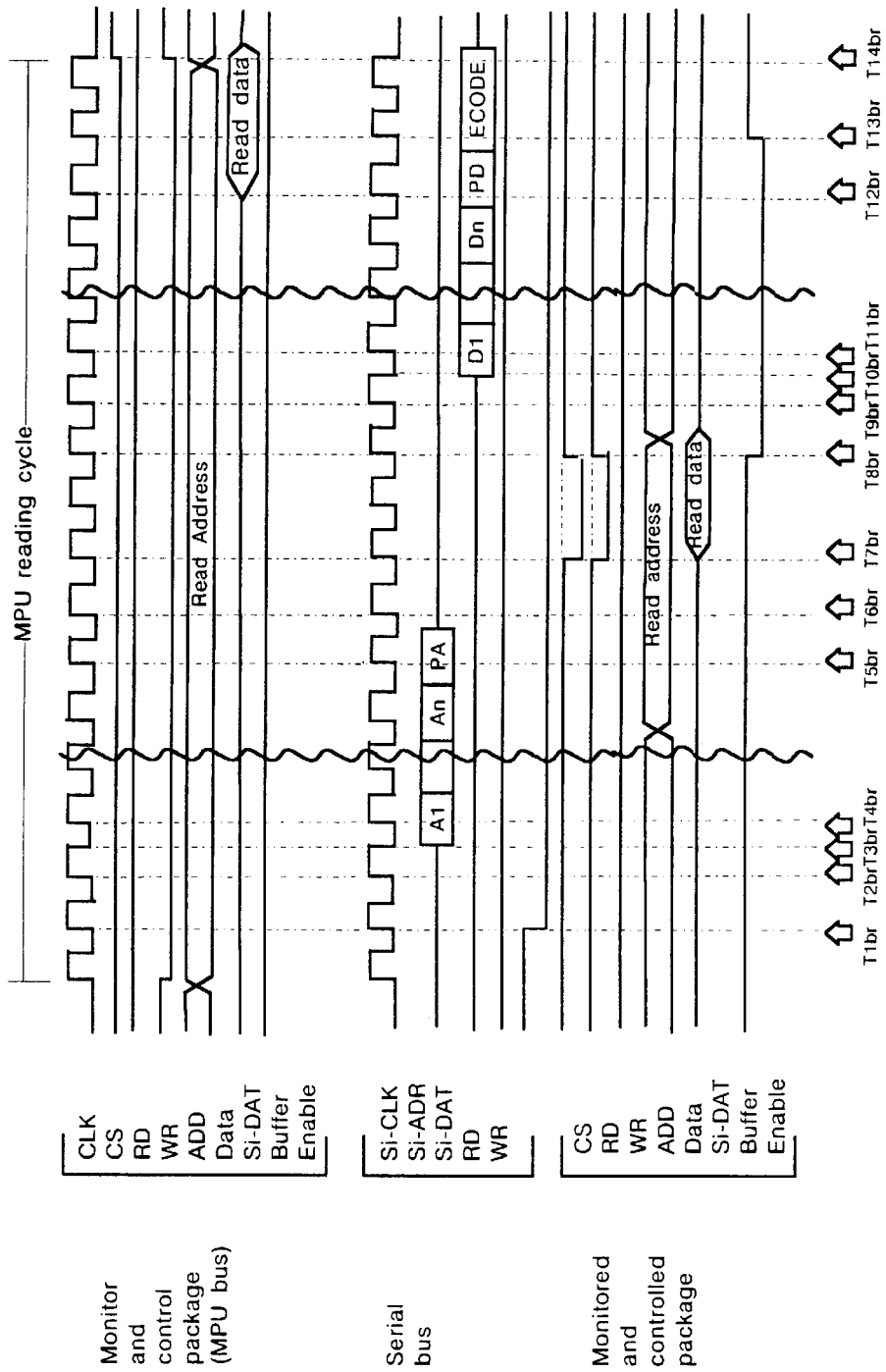
FIG. 14 is a timing chart when executing the reading access corresponding to the second embodiment.

FIGS. 9 and 10 are operational flow charts when executing memory writing access, FIGS. 11 and 12 are operational flow charts when executing a memory reading access, FIG. 13 is a timing chart when executing the memory writing access, and FIG. 14 is a timing chart when executing the reading access, corresponding to the embodiment shown in FIG. 8.

Symbols and numbers of FIGS. 9 to 12 have the same meaning as those explained in FIGS. 5 and 6. Additionally, numbers of Tx in FIGS. 9 and 10 are corresponding to those of FIG. 13, and numbers of Tx in FIGS. 11 and 12 are corresponding to those of FIG. 14.

Further, meaning of symbols of FIG. 13 are as follows:
T1bw: Latching address/data, enabling a Si-DAT buffer on the monitored and controlled package, and enabling a RD/WR buffer
T2bw: Generating and attaching an address/data parity
T3bw: Starting parallel/serial transmission of the address/data
T4bw: Starting serial/parallel reception of the address/data
T5bw: Latching the address/data, disabling the Si-DAT buffer on the monitor and control package, and judging the address T6*bw*: Checking an address/data parity T7*bw*: Outputting a CS/WR signal (the memory writing access)

T8*bw*: Generating error codes, and enabling a Si-DAT buffer on the monitored and controlled package T9*bw*: Starting parallel/serial transmission of the error codes T10*bw*: Starting serial parallel reception of the error codes, and disabling the Si-DAT buffer on the monitored and controlled package T11*bw*: Outputting the error codes to the transmitted status displaying register section and completing the memory writing access.

Further, meaning of symbols of FIG. 14 are as follows:

T1*br*: Latching an address and enabling a RD/WR buffer

T2*br*: Generating and attaching an address parity

T3*br*: Starting parallel/serial transmission of the address

T4*br*: Starting serial/parallel reception of the address

T5*br*: Latching and judging the address

T6*br*: Checking the address parity

T7*br*: Outputting a CS/RD signal (the memory reading access)

T8*br*: Latching the read data, and enabling a Si-DAT buffer on the monitored and controlled package T9*br*: Generating and attaching the read data parity and the error codes T10*br*: Starting parallel/serial transmission of the read data T11*br*: Starting serial/parallel reception of the read data T12*br*: Latching the read data T13*br*: Checking the read data parity, enabling the data output buffer, and disabling a Si-DAT buffer on the monitored and controlled package T14*br*: Outputting to the transmitted status displaying register, completing the memory reading access, and disabling the data output buffer.

The memory writing access will be now explained in accompanying with FIGS. 9, 10 and 13.

When generating the memory writing access request from the MPU 1 of the monitor and control package 100 (STEP F1Wb), the timing generator 5 judges the access is addressed to the monitored and controlled package 200 (STEP F2Wb).

When the access is addressed to the monitored and controlled package 200, the timing generator 5 controls the latch circuits 101 and 102 to latch address and data, makes a serial data buffer 105 on the monitor and control package 100 and a RD/WR buffer 109 enable (T1bw of STEP F3Wb and T1bw of FIG. 13).

The transmitted address/data parity generating and attaching sections 110 and 111 attach parity bits to the address and data latched in the latch circuits 101 and 102 (T2*b*W of STEP F4*b*W).

The parallel/serial converters 103 and 104 convert the address and data, to which parity bits are attached, into serial address and data. The serial data is transmitted to the monitored and controlled package 200 through a serial data buffer 105. After completing the data transmission, the serial data buffer 105 of the monitor and control package 100 is disabled (STEP F5Wb).

When outputting a WR signal to the serial bus (STEP F6Wb), the monitored and controlled package 200 becomes a receiving state, and the serial/parallel converters 203 and 205 converts the address and data into parallel address and data (T4*bw* of STEP F7Wb).

After completing the address/data reception, the latch circuits 204 and 206 latch the received address/data, and transmits them to the memory 201. Simultaneously, the address judgement section 210 judges whether or not the access is addressed to the own package (T5*bw* of STEPS F8Wb and F9Wb). When the access is not addressed to the own package, the access control circuit 211 masks the memory chip select signal CS.

When the access is addressed to the own package, parity check circuits 216 and 212 check the parities of the address and data. If an error is found, the access control circuit 211 masks the memory chip select signal CS (T6*bw* of STEP F10Wb, F11Wb).

When the access is addressed to the own package and no error is found, the timing generator 202 outputs a WR signal (T7*bw* of STEP F12Wb), and executes the memory writing access (T7*bw* of STEP F13Wb).

After completing the memory writing access, a transmitted status (error code) generating and attaching section 214 generates error codes, and makes the serial data buffer 209 of the monitored and controlled package 200 enable (T8*bw* of STEP F14Wb).

When a parity error is found in the received address/data, a transmitted status (error code) generating and attaching section 214 generates error codes. When generating the error codes, the parallel/serial converter 208 converts the parallel error codes into serial error codes (T9*bw* of STEP F15Wb), and transmits them to the monitor and control package 100.

After completing the error code transmission, the serial data buffer 209 of the monitored and controlled package 200 is disabled (T10*bw* of STEP F16Wb).

When transmitting the error code from the monitored and controlled package 200, the serial/parallel converter 106 converts the error codes into parallel error codes, and outputs them to the transmitted status displaying register 113. In here, the memory writing access is completed (T11*bw* of STEP F17Wb).

After completing the memory writing access, the MPU 1 can confirm a normality of the access by reading the transmitted status displaying register 113.

Operations when executing the memory reading access will be now explained in accompanying with FIGS. 11, 12 and 14. When a memory reading access request is generated by the MPU 1 of the monitor and control package 100, the timing generator 5 judges whether or not the access is addressed to the monitored and controlled package 200 (STEPs F1Rb and F2Rb of FIG. 11).

When the access is addressed to the monitored and controlled package 200, the timing generator 5 controls the latch circuit 101 to latch the address and makes the RD/WR buffer 108 enable (T1*br* of STEP F3Rb).

The transmitted address parity generating and attaching section 110 attaches a parity bit to the address latched by the latch circuit 101 (T2*br* of STEP F4Rb). The parallel/serial converter 103 converts the address, to which a parity bit is attached, into a serial address, and transmits the converted address to the monitored and controlled package 200 (T3*br* of STEP F5Rb).

When outputting the RD signal to the serial bus, the monitored and controlled package 200 becomes a receiving state, and the serial/parallel converter 203 converts the address into a parallel address (STEP F6Rb and T4*br* of STEP F7Rb).

When completing the address reception, the latch circuit 204 latches the received address, and transmits it to the memory 201. Simultaneously, the address judgement section 210 judges whether or not the access is addressed to the own package. When the access is not addressed to the own package 200, the access control circuit 211 masks the memory chip select signal CS (T5br of STEP F8Rb and STEP F9Rb).

When the access is addressed to the own package 200, the parity check circuit 216 checks the parity of the address. When an error is found, the access control circuit 211 masks the memory chip select signal CS (T6br of STEP F10Rb and STEP F11Rb).

When the access is not addressed to the own package 200 and no error is found, the timing generator 202 outputs the RD signal (T7br of STEP F12Rb), the memory reading access is executed (T7br of STEP F13Rb).

After completing the memory reading access, the timing generator 202 controls the latch circuit 207 to latch the read data and makes the serial data buffer 209 of the monitored and controlled package 200 enable (T8br of STEP F14Rb).

The transmitted data parity generating and attaching section 213 attaches a parity bit to the read data latched by the latch circuit 207, and the transmitted status (error code) generating and attaching section 214 attaches the error code to the read data. If a parity error is found in the received address, the error code is attached on this step (T9br of STEP 15Rb).

When generating the parity and error code of the address, the parallel/serial converter 208 converts them into serial data and transmits it to the monitor and control package 100. When completing the read data transmission, the serial data buffer 209 of the monitored and controlled package 200 is disabled (T10br of STEP F16Rb and T13br of STEP F19Rb).

When transmitting the read data from the monitored and controlled package 200, the serial/parallel converter 106 of the monitor and control package 100 converts the read data into parallel data (T11br of STEP F17Rb). After finishing the conversion, the latch circuit 107 latches the converted read data (T12br of F18Rb).

The received data parity checking and transmitted status (error code) extracting section 112 filters the latched read data into the read data and the error code. In here, the read data becomes an subject of the parity check (T13br of STEP F19Rb and STEP F20Rb).

If a parity error is found, the parity error is attached to the received error code, and the memory reading access is finished (STEP F20Rb). If not, the data output buffer 108 is enabled and the read data is transmitted to the MPU bus (T13br of STEPs F21Rb and F22Rb).

After finishing the memory reading access from the MPU 1, the data output buffer 108 is disabled, and the error codes are output to the transmitted status displaying register 113. Then, the memory reading access is finished (T14br of STEP F23Rb).

After finishing the memory reading access, the MPU1 can confirm a normality of the access by reading the transmitted status displaying register 113.

In the present embodiment, it is possible to realize reliability of the serial interface by attaching a parity bit generating sections to the structure of the first embodiment. That may bring an improvement of reliability of a transmission device or system.

Figure 15:
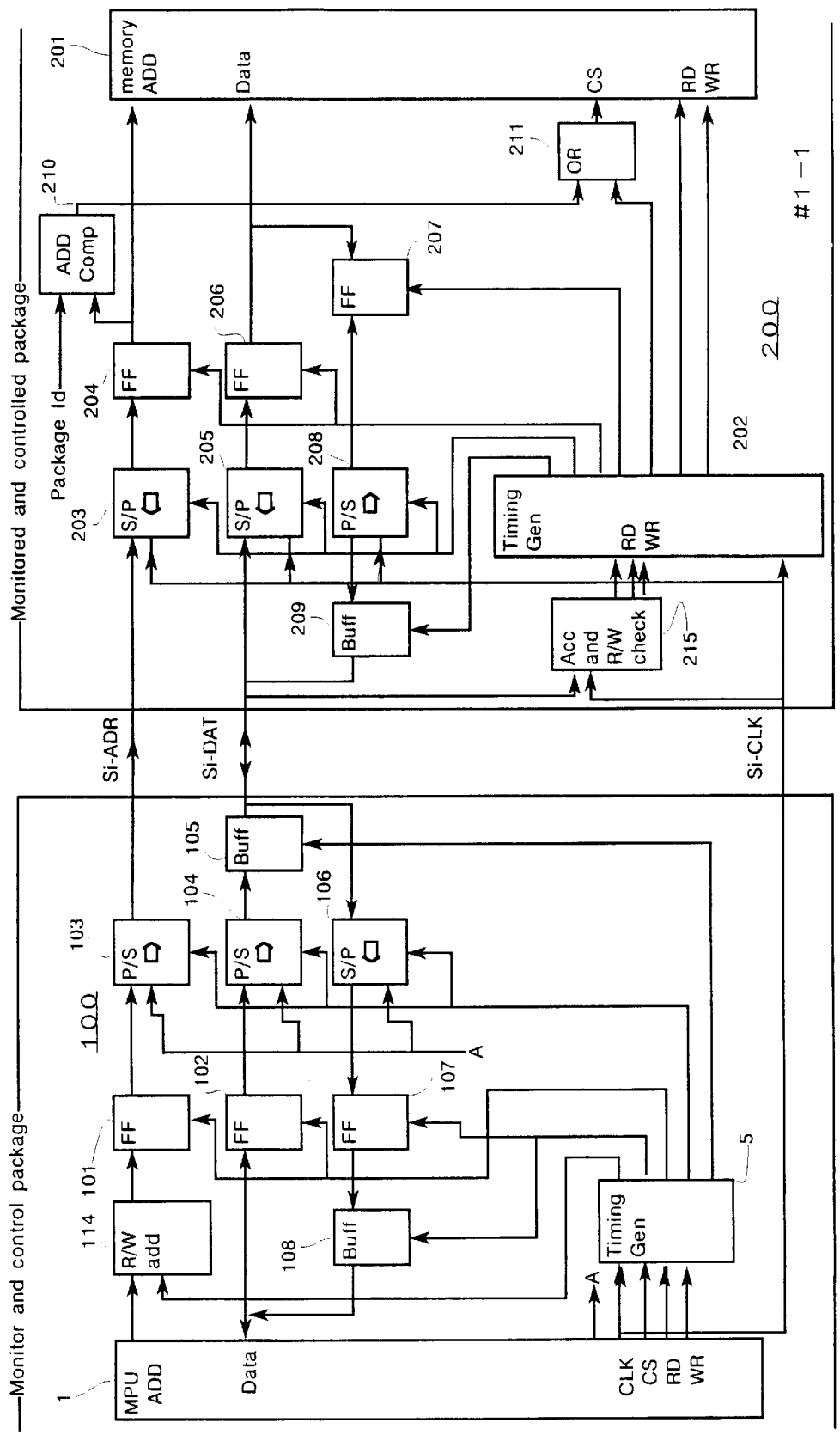
FIG. 15 is a block diagram of a third embodiment of the monitor and control package 100 and the monitored and controlled package 200.

FIG. 15 shows a structural example of a third embodiment of the present invention. In the third embodiment, three lines of an serial address (Si-ADR), a serial data (Si-DAT) and a serial clock (Si-CLK) are employed to interface between the monitor and control package 100 and the monitored and controlled package 200. When comparing with the first embodiment, the number of connections of the interface between the monitor and control package 100 and the monitored and controlled package 200 is further reduced.

In the structure of the third embodiment, the RD/WR output buffer 109 is deleted from the monitor and control package 100 and a control signal attaching circuit 114 is added to the structure of the first embodiment. Additionally, an access judging and RD/WR signal judging circuit 215 is added to the monitored and controlled package 200.

Figure 16:
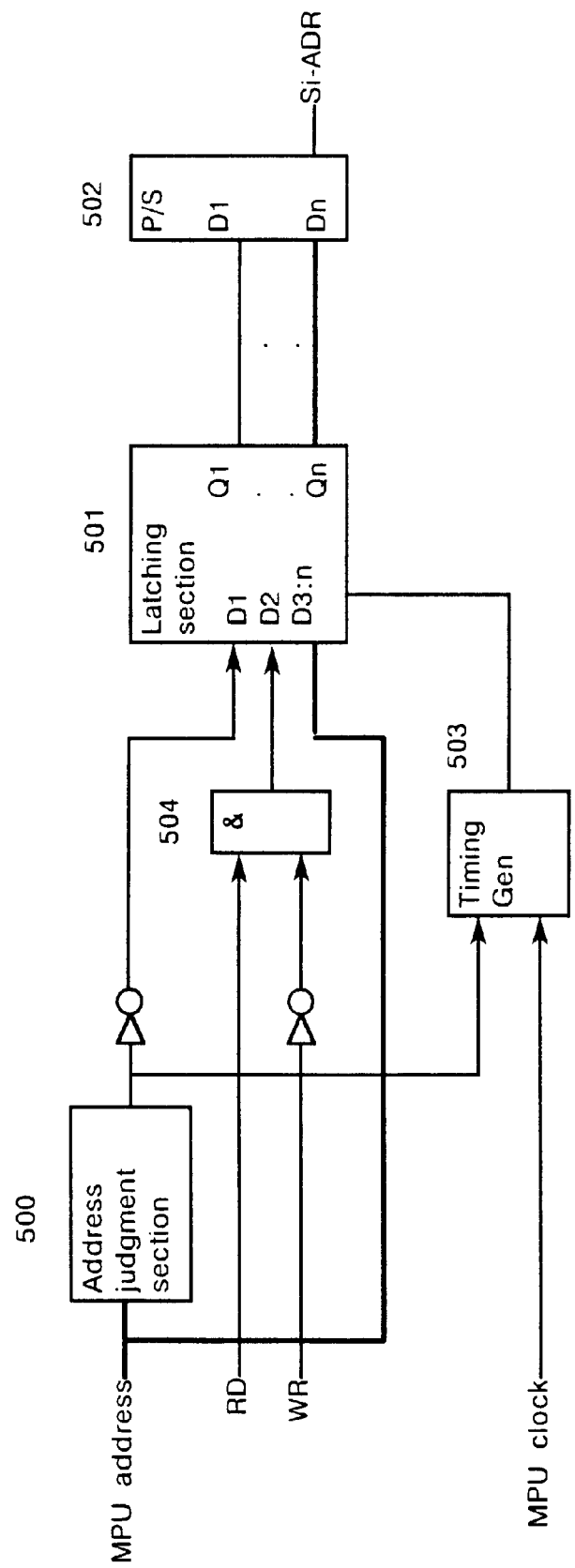
FIG. 16 shows a structural example of a control signal attaching circuit 114, which is added to the monitor and control package 100.
Figure 17:
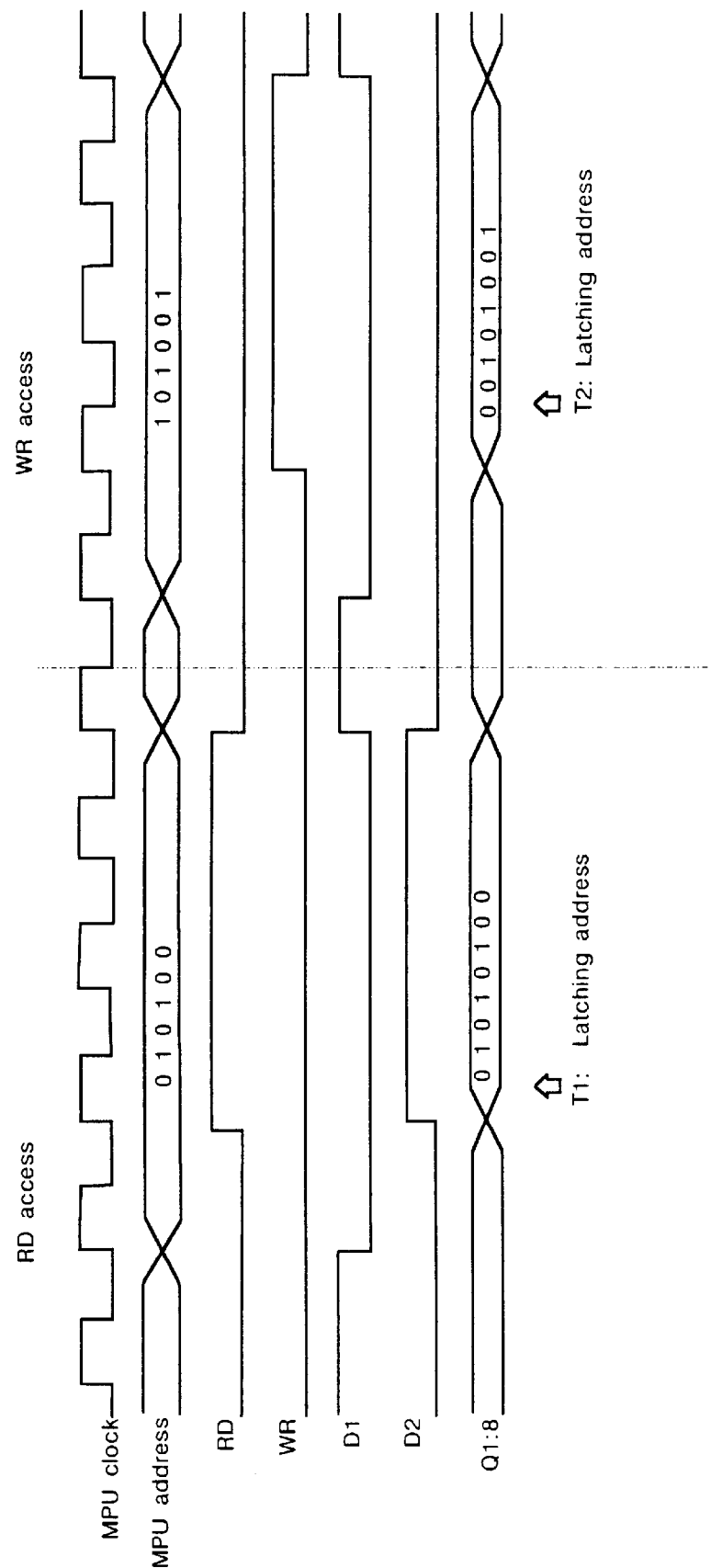
FIG. 17 is an operational timing chart of the control signal attaching circuit 114 of FIG. 16.

FIG. 16 is a structural example of the control signal attaching circuit 114, which is added to the monitor and control package 100, and FIG. 17 shows the operational timing chart. The control signal attaching circuit 114 consists of an address judgment section 500, a latching section 501, and a parallel/serial converter 502. When the address judgement section 500 judges the access is addressed to the monitored and controlled package 200, "0" is output to a terminal D1 of the latching section 501. "0" is output to a terminal D2 of the latching section 501 when the signal is an RD signal, and "1" is output to the terminal D2 when the signal is a WR signal. An address input to a terminal D3 is attached to the data of 2 bits. The attached address is output to the parallel/serial converter 502 as an address.

Thereby, as shown in the timing chart shown in FIG. 17 (an example when n is 8bits), an MPU address becomes "01+address" when a reading (RD) access is executed for the monitored and controlled package 200. On the contrary, the MPU address becomes "00+address" when a writing (WR) access is executed for the package 200.

Figure 18:
FIG. 18 shows a structural example of an access judging and RD/WR signal judging circuit 215 of the monitored and controlled package 200.
Figure 19:
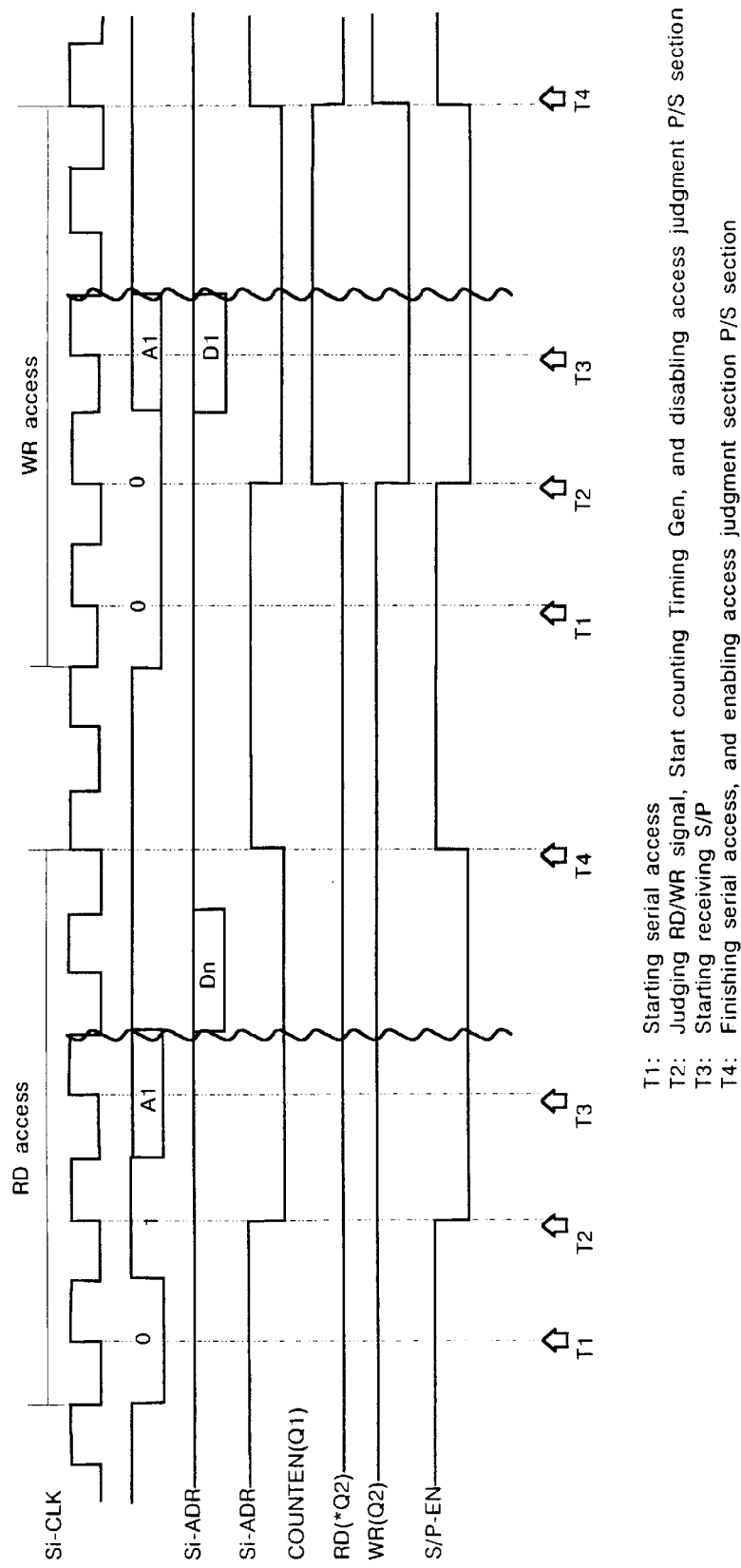
FIG. 19 is an operational timing chart of the access judging and RD/WR signal judging circuit 215 of FIG. 18.
Figure 20:
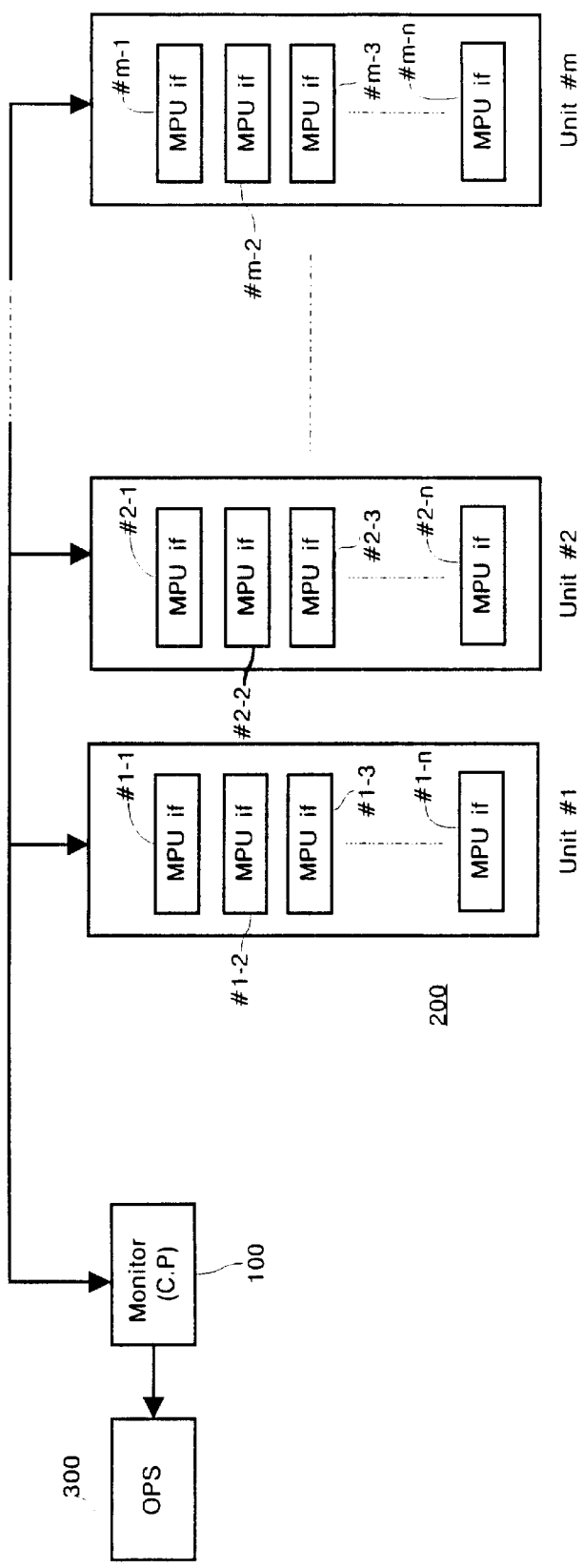
FIG. 20 is an explanatory diagram of a structural example of a transmission device.

FIG. 18 is an structural example of the access judging and RD/WR signal judging circuit 215 of the monitored and controlled package 200. FIG. 19 shows the operational timing chart. The access judging and RD/WR signal judging circuit 215 is formed of a serial/parallel converter of 2 bits.

This circuit 215 always monitors a "01/00" pattern on the serial address (Si-ADR) bus, converts the address into a parallel address when the pattern address is inputted, and outputs the parallel address as a control signal of the COUNTEN signal and the RD/WR signal to the timing generator 202.

When transmitting the "01/00" pattern to the serial address (Si-ADR) bus, the access judging and RD/WR signal judging circuit 215 converts the serial data on the bus into parallel data and outputs the data as the COUNTEN signal and the RD/WR signal to the timing generator 202.

The timing generator 202 starts counting, makes the access judging and RD/WR signal judging circuit 215 disable, and stops monitoring the access to the serial bus (on timings T1 and T2 of FIG. 19). The timing generator 202, which starts counting, starts receiving outputs converted from the serial address to the parallel address, and executes the serial access (on a timing T3 of FIG. 19).

After finishing the serial access, the timing generator 202 makes the RD/WR judging circuit 215 enable, and restarts monitoring the serial bus (on a timing T4 of FIG. 19).

It becomes possible to delete the RD/WR control signal by multiplexing the RD/WR control signal to the address, and transmitting it as a serial address (Si-ADR). That makes enable to interface between the monitor and control package 100 and the monitored and controlled package 200 with three connections.

The comparison of the third embodiment and the conventional system can be expressed as follows:

|  | Conventional system (Parallel bus access communication method) | Third embodiment |
| --- | --- | --- |
| Address line | 8 | 1 |
| Data line | 8 | 1 |
| Control line | 2 | none |
| Chip select line (CS) | 5 | none |
| Transmitted clock | none | 1 |
| Total | 23 | 3 |

As described above, a number of connections in the third embodiment becomes one-eight as many as that of the conventional system. Additionally, the serial interface can be realized by smaller number of connections than that of the first embodiment.

As is explained in accompanying with the drawings, a number of signal lines for interfacing among units can be reduced according to the present invention. Thereby, it becomes possible to reduce a number of connectors to connect among units, and reduce a number of drivers/receiver ICs. In other words, it becomes possible to realize reducing the mounting dimension, lowering consumption power and reducing the cost.

Additionally, that realizes high performance and quality of the system by reducing a scale of a hardware, such as a number of interface signal lines is not increased regardless of a number of monitored and controlled packages. Consequently, as serial communications can be facilitated with accesses, similarly with memory accesses, it becomes possible to develop a software, regardless of a protocol. As the result, load on the software can be reduced, thus reducing a time for developing the software and realizing reliability of the system.

Further, as communications can be facilitated by accesses, similarly to memory accesses because a communication is completed with one bus cycle of a MPU, it becomes possible to debug the software, regardless of steps for developing a hardware. That makes easy to keep the steps for developing the software. Therefore, a time for developing the software can be reduced, the appointed date of delivery of products can be cleared, and further, high quality can be realized.

Furthermore, that carries magnification of shares on the market by realizing high performance and quality of the device and reducing the appointed data caused by realizing the high performance/quality of the system, reducing a time of developing the software and realizing the reliability.

The present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A monitor and control system, comprising:
    a serial bus;
    a monitor and control package having:
        a controller generating parallel addresses and data; and
        a first converter converting the parallel addresses and data to corresponding serial addresses and data; and
    a plurality of monitored and controlled packages connected to the monitor and control package through the serial bus, each having:
        a second converter converting the serial addresses and data, which are sent from the first converter through the serial bus, into parallel addresses; and
        an address judgment section which judges whether or not an access is addressed to the monitored and controlled package concerned, according to a parallel address, which is converted by the corresponding second converter.

2. The monitor and control system according to claim 1, wherein the monitor and control package further has a third converter, which converts the serial data transmitted from the monitored and controlled package into parallel data.

3. The monitor and control system according to claim 1, wherein the monitor and control package and each of the monitored and controlled packages respectively have a parity generator, which generates a parity bit and attaches the parity bit to the parallel address and data, and a parity check section, which checks the parity bit of parallel address and data after converting the received serial address and data into parallel address and data.

4. The monitor and control system according to claim 3, wherein each of the monitored and controlled packages has a memory access controller, and the memory access controller monitors errors on the serial buses, and inhibits to access the memory of the monitored and controlled packages when an error is found.

5. The monitor and control system according to claim 1, wherein each of the monitored and controlled packages has a memory access controller, and the memory access controller monitors errors on the serial buses, and inhibits to access the memory of the monitored and controlled packages when an error is found.

6. The monitor and control system according to claim 1, wherein the monitor and control package has a latch circuit, which latches a parallel address and a parallel signal, which is different from the parallel address at the same time, and outputs from the latch circuit are converted to serial signals by the first converter.

7. The monitor and control system according to claim 6, wherein the parallel address or the parallel signal, which is different from the parallel data is used as a writing or reading control signal, which accesses a memory of the monitored and controlled package.

8. The monitor and control system according to claim 1, wherein the monitor and control package and the plurality of monitored an controlled packages include first and second timing generators, respectively, and converting by the first and second converters is controlled by outputs from the first and second timing generators.

9. A monitor and control system comprising:
    a serial bus;
    a monitor and control package; and
    a plurality of monitored and controlled packages connected to the monitor and control package through the serial bus,
    wherein the monitor and control package has,
        a controller,
        a first parallel to serial converter, which converts parallel address and data sent from the controller into corresponding serial address and data,
        a first serial to parallel converter, which converts serial data received from each of the monitored and controlled packages, and a first timing generator, which controls converting timings of the first serial to parallel converter, and each of the plurality of monitored and controlled packages has, a second converter, which converts the serial addresses and data sent from the first converter through the serial bus, into parallel addresses and data, a second serial to parallel converter, which converts the received serial address and data into parallel address and data, an address judgment section, which judges whether or not an access is addressed to the monitored and controlled package concerned, according to a parallel address, which is converted by the corresponding second serial to parallel converter, a second parallel to serial converter, which converts the parallel transmitted data into serial data, and a second timing generator, which controls operation timings of the second serial to parallel converter, the address judgment section and the second parallel to serial converter.

10. The system according to claim 9, wherein the monitor and control package and each of the plural monitored and controlled packages respectively includes a parity generator, which generates a parity bit and attaches the parity bit to the parallel address and data, and a parity check sections, which checks the parity bit of the parallel address and data after converting the received serial address and data into parallel address and data.

11. The monitor and control system according to claim 9, wherein each of the monitored and controlled packages includes a memory access controller which monitors errors on the serial buses, and inhibits to access the memory of the monitored and controlled package when an error is generated.

12. The monitor and control system according to claim 9, wherein the monitor and control package includes a latch circuit, which latches the parallel address and a parallel signal, which is different from the parallel address, and outputs of the latch circuits are converted into serial signals by the first converter.

13. The monitor and control system according to claim 12, wherein the parallel address and a parallel signal, which is different from parallel data, is a writing or reading control signal for accessing the memory of the monitored and controlled package.

* * * * *

UNITED STATES PATENT AND TRADEMARK OFFICE
CERTIFICATE OF CORRECTION

PATENT NO. : 6,385,754 B1
DATED : May 7, 2002
INVENTOR(S) : K. Mizumoto et al.

It is certified that error appears in the above-identified patent and that said Letters Patent is hereby corrected as shown below:

<u>Title page,</u>
Item [75], please correct the name of the last inventor to read:
-- Kenichi Kuwako --

Signed and Sealed this

Twenty-fifth Day of March, 2003

JAMES E. ROGAN
*Director of the United States Patent and Trademark Office*